United States Patent
Coenen

(10) Patent No.: US 8,996,177 B2
(45) Date of Patent: Mar. 31, 2015

(54) ROBOTIC TRAINING APPARATUS AND METHODS

(71) Applicant: Brain Corporation, San Diego, CA (US)

(72) Inventor: Olivier Coenen, San Diego, CA (US)

(73) Assignee: Brain Corporation, San Diego, CA (US)

( * ) Notice: Subject to any disclaimer, the term of this patent is extended or adjusted under 35 U.S.C. 154(b) by 261 days.

(21) Appl. No.: 13/841,980

(22) Filed: Mar. 15, 2013

(65) Prior Publication Data

US 2014/0277744 A1    Sep. 18, 2014

(51) Int. Cl.
   G05B 15/00    (2006.01)
   B25J 9/16    (2006.01)

(52) U.S. Cl.
   CPC ............. *B25J 9/163* (2013.01); *Y10S 901/03* (2013.01)
   USPC ............................... 700/264; 700/245; 901/3

(58) Field of Classification Search
   CPC ........................................ B25J 9/163
   USPC ............................................ 700/264
   See application file for complete search history.

(56) References Cited

U.S. PATENT DOCUMENTS

| | | | |
|---|---|---|---|
| 5,063,603 A | 11/1991 | Burt | |
| 5,355,435 A | 10/1994 | DeYong | |
| 5,638,359 A | 6/1997 | Peltola | |
| 5,673,367 A | 9/1997 | Buckley | |
| 5,875,108 A | 2/1999 | Hoffberg | |
| 6,009,418 A | 12/1999 | Cooper | |
| 6,014,653 A | 1/2000 | Thaler | |
| 6,259,988 B1 | 7/2001 | Galkowski | |
| 6,458,157 B1 | 10/2002 | Suaning | |
| 6,545,705 B1 | 4/2003 | Sigel | |
| 6,545,708 B1 | 4/2003 | Tamayama | |
| 6,546,291 B2 | 4/2003 | Merfeld | |
| 6,581,046 B1 | 6/2003 | Ahissar | |
| 6,760,645 B2 * | 7/2004 | Kaplan et al. | 700/245 |

(Continued)

FOREIGN PATENT DOCUMENTS

| CN | 102226740 | 10/2011 |
|---|---|---|
| JP | 4087423 | 3/1992 |

(Continued)

OTHER PUBLICATIONS

Tank, et al., "Neural computation by concentrating information in time", Proc. Nati. Acad. Sci. USA, vol. 84, Apr. 1987, pp. 1896-1900.

(Continued)

*Primary Examiner* — Jerrah Edwards
*Assistant Examiner* — Tamara Weber
(74) *Attorney, Agent, or Firm* — Pillsbury Winthrop Shaw Pittman LLP

(57) ABSTRACT

Adaptive controller apparatus of a robot may be implemented. The controller may be operated in accordance with a reinforcement learning process. A trainer may observe movements of the robot and provide reinforcement signals to the controller via a remote clicker. The reinforcement may comprise one or more degrees of positive and/or negative reinforcement. Based on the reinforcement signal, the controller may adjust instantaneous cost and to modify controller implementation accordingly. Training via reinforcement combined with particular cost evaluations may enable the robot to move more like an animal.

19 Claims, 13 Drawing Sheets

(56) References Cited

U.S. PATENT DOCUMENTS

| | | | |
|---|---|---|---|
| 7,849,030 B2 | 12/2010 | Ellingsworth | |
| 8,015,130 B2 | 9/2011 | Matsugu | |
| 8,145,355 B2* | 3/2012 | Danko | 700/251 |
| 8,315,305 B2 | 11/2012 | Petre | |
| 8,467,623 B2 | 6/2013 | Izhikevich | |
| 8,793,205 B1 | 7/2014 | Fisher | |
| 2001/0045809 A1* | 11/2001 | Mukai | 318/568.22 |
| 2002/0038294 A1 | 3/2002 | Matsugu | |
| 2003/0050903 A1 | 3/2003 | Liaw | |
| 2004/0158358 A1 | 8/2004 | Anezaki | |
| 2004/0162638 A1 | 8/2004 | Solomon | |
| 2004/0193670 A1 | 9/2004 | Langan | |
| 2005/0015351 A1 | 1/2005 | Nugent | |
| 2005/0036649 A1 | 2/2005 | Yokono | |
| 2005/0049749 A1 | 3/2005 | Watanabe | |
| 2005/0065651 A1 | 3/2005 | Ayers | |
| 2005/0283450 A1 | 12/2005 | Matsugu | |
| 2006/0069448 A1* | 3/2006 | Yasui | 623/24 |
| 2006/0161218 A1 | 7/2006 | Danilov | |
| 2007/0176643 A1 | 8/2007 | Nugent | |
| 2007/0208678 A1 | 9/2007 | Matsugu | |
| 2008/0294074 A1* | 11/2008 | Tong et al. | 601/5 |
| 2009/0043722 A1 | 2/2009 | Nugent | |
| 2009/0287624 A1 | 11/2009 | Rouat | |
| 2010/0086171 A1 | 4/2010 | Lapstun | |
| 2010/0166320 A1 | 7/2010 | Paquier | |
| 2010/0286824 A1 | 11/2010 | Solomon | |
| 2010/0292835 A1 | 11/2010 | Sugiura | |
| 2011/0016071 A1 | 1/2011 | Guillen | |
| 2011/0119214 A1 | 5/2011 | Breitwisch | |
| 2011/0119215 A1 | 5/2011 | Elmegreen | |
| 2012/0011090 A1 | 1/2012 | Tang | |
| 2012/0109866 A1 | 5/2012 | Modha | |
| 2012/0143495 A1 | 6/2012 | Dantu | |
| 2012/0173021 A1* | 7/2012 | Tsusaka | 700/258 |
| 2012/0185092 A1* | 7/2012 | Ku | 700/258 |
| 2012/0209428 A1* | 8/2012 | Mizutani | 700/250 |
| 2012/0209432 A1 | 8/2012 | Fleischer | |
| 2012/0303091 A1 | 11/2012 | Izhikevich | |
| 2012/0308076 A1 | 12/2012 | Piekniewski | |
| 2012/0308136 A1 | 12/2012 | Izhikevich | |
| 2013/0073491 A1 | 3/2013 | Izhikevich | |
| 2013/0073496 A1 | 3/2013 | Szatmary | |
| 2013/0073500 A1 | 3/2013 | Szatmary | |
| 2013/0116827 A1 | 5/2013 | Inazumi | |
| 2013/0151450 A1 | 6/2013 | Ponulak | |
| 2013/0218821 A1 | 8/2013 | Szatmary | |
| 2013/0251278 A1 | 9/2013 | Izhikevich | |
| 2013/0325768 A1 | 12/2013 | Sinyavskiy | |
| 2013/0325773 A1 | 12/2013 | Sinyavskiy | |
| 2013/0325774 A1 | 12/2013 | Sinyavskiy | |
| 2013/0325775 A1 | 12/2013 | Sinyavskiy | |
| 2014/0016858 A1 | 1/2014 | Richert | |
| 2014/0089232 A1 | 3/2014 | Buibas | |

FOREIGN PATENT DOCUMENTS

| | | | | |
|---|---|---|---|---|
| NL | WO2010136961 | * | 12/2010 | G05B 19/423 |
| RU | 2108612 | | 10/1998 | |
| WO | 2008083335 | | 7/2008 | |

OTHER PUBLICATIONS

Bohte, "Spiking Nueral Networks" Doctorate at the University of Leiden, Holland, Mar. 5, 2003, pp. 1-133 [retrieved on Nov. 14, 2012]. Retrieved from the internet: <URL: http://homepages.cwi.nl/-sbohte/publication/phdthesis.pdf>.

Brette et al., Brian: a simple and flexible simulator for spiking neural networks, The Neuromorphic Engineer, Jul. 1, 2009, pp. 1-4, doi: 10.2417/1200906.1659.

Cuntz et al., "One Rule to Grow Them All: A General Theory of Neuronal Branching and Its Paractical Application" PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Fidjeland et al., Accelerated Simulation of Spiking Neural Networks Using GPUs [online], 2010 [retrieved on Jun. 15, 2013], Retrieved from the Internet: URL:http://ieeexplore.ieee.org/xpls/abs_all.jsp?arnmber=5596678&tag=1.

Floreano et al., "Neuroevolution: from architectures to learning" Evol. Intel. Jan. 2008 1:47-62, [retrieved Dec. 30, 2013] [retrieved online from URL:<http://inforscience.epfl.ch/record/112676/files/FloreanoDuerrMattiussi2008.pdf>.

Gewaltig et al., NEST (Neural Simulation Tool), Scholarpedia, 2007, pp. 1-15, 2( 4 ): 1430, doi: 1 0.4249/scholarpedia.1430.

Gleeson et al., ) NeuroML: A Language for Describing Data Driven Models of Neurons and Networks with a High Degree of Biological Detail, PLoS Computational Biology, Jun. 2010, pp. 1-19 vol. 6 Issue 6.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098.

Graham, Lyle J., The Surf-Hippo Reference Manual, http://www.neurophys.biomedicale.univparis5. fr/-graham/surf-hippo-files/Surf-Hippo%20Reference%20Manual.pdf, Mar. 2002, pp. 1-128.

Izhikevich, "Polychronization: Computation with Spikes", Neural Computation, 25, 2006, 18, 245-282.

Izhikevich, "Simple Model of Spiking Neurons", IEEE Transactions on Neural Networks, vol. 14, No. 6, Nov. 2003, pp. 1569-1572.

Izhikevich, "Relating STDP to BCM", Neural Computation 15, 1511-1523 (2003).

Karbowski et al., "Multispikes and Synchronization in a Large Neural Network with Temporal Delays", Neural Computation 12, 1573-1606 (2000).

Khotanzad, "Classification of invariant image representations using a neural network" IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.

Laurent, "The Neural Network Query Language (NNQL) Reference" [retrieved on Nov. 12, 2013]. Retrieved from the Internet: URL:http://nnql.org/nnql.org.

Laurent, "Issue 1—nnql—Refactor Nucleus into its own file—Neural Network Query Language" [retrieved on Nov. 12, 2013]. Retrieved from the Internet: URL:https://code.google.com/p/nnql/issues/detail?id=1.

Nichols, A Reconfigurable Computing Architecture for Implementing Artificial Neural Networks on FPGA, Master's Thesis, The University of Guelph, 2003, pp. 1-235.

Pavlidis et al. Spiking neural network training using evolutionary algorithms. In: Proceedings 2005 IEEE International Joint Conference on Neural Networks, 2005. IJCNN'05, vol. 4, pp. 2190-2194 Publication Date Jul. 31, 2005 [online] [Retrieved on Dec. 10, 2013] Retrieved from the Internet <URL:http://citeseerx.ist.psu.edu/viewdoc/download?doi=10.1.1.5.4346&rep=rep1&type=pdf.

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].

Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.cgi/4620/ps/1774.pdf>.

(56) References Cited

OTHER PUBLICATIONS

Simulink® model [online], [Retrieved on Dec. 10, 2013] Retrieved from <URL: http://www.mathworks.com/products/simulink/index.html>.

Sinyavskiy et al. "Reinforcement learning of a spiking neural network in the task of control of an agent in a virtual discrete environment" Rus. J. Nonlin. Dyn., 2011, vol. 7, No. 4 (Mobile Robots), pp. 859-875, chapters 1-8 (Russian Article with English Abstract).

Sjostrom J., W. Gerstner. Spike-Timing Dependent Plasticity. Scholarpedia, [Online], 2010, 5(2), 1362.

Szatmary et al., "Spike-timing Theory of Working Memory" PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371%2Fjournal.pcbi.1000879#>.

Huh et al., "Generalized Power Law for Curve Movements" 2011.

Huh et al., "Real-Time Motor Control Using Recurrent Neural Networks" IEEEE Apr. 2009.

Huh, "Rethinking Optimal Control of Human Movements" Thesis 2012.

Mordatch et al., "Discovery of Complex Behaviors through Contract-Invariant Optimization" ACM Transactions on Graphics (TOG)—SIGGRAPH 2012 Conference.

Pham et al., "Affine invariance of human hand movements: a direct test" 2012.

Schaal et al., An Example Application of Policy Improvement with Path Integrals ($PI^2$), Jun. 9, 2010.

Todorov "Direct Cortical Control of Muscle activation in voluntary arm movements: a model" Nature America Inc. http://neurosci.nature.com 2000.

PCT International Search Report for PCT/US2014/026738 dated Jul. 21, 2014.

Asensio et al., "Robot Learning Control Based on Neural Network Prediction" ASME 8th Annual Dynamic Systems and Control Conference joint with the JSME 11th Motion and Vibration Conference 2012 [Retrieved on: Jun. 24, 2014]. Retrieved fro internet: <http://msc.berkeley.edu/wjchen/publications/DSC12_8726_FI.pdf>.

Bouganis et al., Training a Spiking Neural Network to Control a 4-DoF Robotic Arm based on Spiking Timing-Dependent Plasticity in WCCI 2010 IEEE World Congress on Computational Intelligence Jul. 2010 [Retrieved on Jun. 24, 2014] Retrieved from internet: <http://www.doc.ic.ac.uk/-mpsha/IJCNN10a.pdf.

Kasabov, "Evolving Spiking Neural Networks for Spatio-and Spectro-Temporal Pattern Recognition", IEEE 6th International Conference Intelligent Systems 2012 [Retrieved on Jun. 24, 2014], Retrieved from internet: <http://ncs.ethz.ch/projects/evospike/publications/evolving-spiking-neural-networks-for-spatio-and-spectro-temporal-pattern-recognition-plenary-talk-ieee-is>.

PCT International Search Report for PCT/US2014/026685 dated Oct. 3, 2014.

* cited by examiner

ROBOTIC TRAINING APPARATUS AND METHODS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The present disclosure relates to robotic learning and training of robotic devices.

2. Description of Related Art

Robotic control systems exist. Typically, these systems may comprise a controller apparatus configured to control a plant. The plant may include, for example, a robotic arm. The controller may receive an input signal, and may generate a control signal. The plant may provide a feedback signal to the controller.

In some instances, the controller may receive one or more physical inputs, which may individually comprise continuous (e.g., analog) and/or discrete (e.g., digital) signals describing various variables. Examples of such various variables may include one or more of temperature, voltage, current, orientation, position, plant state, and/or other signals.

Programming the controller to enable a robot to perform complex functions (e.g., approaching objects, perform bi-pedal motions, identify and grasp objects, approach targets while avoiding obstacles, and/or other functions) may be not straightforward. For example, the programming may become a daunting task, particularly when the environment and/or characteristics of the robot (e.g., replaceable limb) may vary between the time of programming and the time of operation.

SUMMARY

One aspect of the disclosure relates to a method for training a computerized robotic apparatus. The method may comprise: establishing a target trajectory for an operation of the robotic apparatus, the target trajectory being characterized by a performance parameter configured based on a cost function; adjusting, with one or more processors, instantaneous cost value based on a training signal, the training signal being provided based on an evaluation of a measure between a current value of the performance parameter and a target value of the performance parameter, the robotic apparatus being configured to receive the training signal via a remote link; and determining, with one or more processors, an updated cost function based on the adjusted instantaneous cost value and the cost function, the updated cost function being configured to transition the performance parameter towards the target value.

In some implementations, the robotic apparatus may be configured to operate autonomously subsequent receipt of the training signal.

In some implementations, the robotic apparatus may be configured to receive the training signal via the remote link based on the evaluation being performed by a human operator.

In some implementations, the evaluation may be based on visual observation of operation of the robotic apparatus.

In some implementations, the evaluation may be devoid of computations of the cost function.

In some implementations, the robotic apparatus may comprise at least one artificial limb. The performance parameter may be configured based on a function of acceleration of at least a portion of the limb. The evaluation may be based on a comparison between (i) a first trajectory motion of the limb during performance of a first task by the robotic apparatus and (ii) a second trajectory motion of a limb of a human during performance of the first task by the human.

In some implementations, the function of the acceleration may comprise jerk. The jerk may be determined based on a temporal derivative of the acceleration.

In some implementations, the limb may comprise an artificial leg and the task comprises a gating motion towards an object.

In some implementations, the limb may comprise an artificial hand and the task comprises grasping of an object by the artificial hand.

In some implementations, the limb may comprise an artificial arm. The artificial hand may be disposed at a distal end of the artificial arm.

In some implementations, the transition of the performance parameter towards the target value may be based on a minimization of the cost function. The training signal may be configured to increase the instantaneous cost value based on the current performance value being separated from the target performance value by a first margin.

In some implementations, the training signal may be configured to decrease the instantaneous cost value based on the current performance value being within the target performance value by a second margin.

In some implementations, the training signal may comprise two or more levels, individual ones of the two or more levels configured based on a distance measure between the current performance and the target performance. The adjustment of the instantaneous cost value may be configured based on a one of the two or more levels.

In some implementations, the target trajectory may be characterized by at least one state parameter. The cost function may be configured based on the state parameter. The instantaneous cost value may be configured to adjust the cost function within a range of the state parameter values.

In some implementations, adjusting the cost function may comprise one or more of a concave, a convex, or a step function determined for the range of the state parameter values.

In some implementations, the state parameter may comprise one or both of a spatial coordinate or a motion characteristic associated with the robotic apparatus.

Another aspect of the disclosure relates to a non-transitory computer-readable storage medium having instructions embodied thereon. The instructions may be executable by a processor to perform a method for training a computerized robotic apparatus. The method may comprise: establishing a target trajectory for an operation of the robotic apparatus, the target trajectory being characterized by a performance parameter configured based on a cost function; adjusting, with one or more processors, instantaneous cost value based on a training signal, the training signal being provided based on an evaluation of a measure between a current value of the performance parameter and a target value of the performance parameter, the robotic apparatus being configured to receive the training signal via a remote link; and determining, with one or more processors, an updated cost function based on the adjusted instantaneous cost value and the cost function, the updated cost function being configured to transition the performance parameter towards the target value.

Yet another aspect of the disclosure relates to a computerized robotic system. The system may comprise a training apparatus and a robotic apparatus. The training apparatus may be configured to train the robotic apparatus. The robotic apparatus may comprise one or more processors configured to execute computer program modules. The computer program modules may comprise a first logic module, a second logic module, and a third logic module. The first logic module may be configured to receive a training signal from the training apparatus. The training signal may be provided based on an evaluation of a measure between a current value of a performance parameter and a target value of the performance parameter. The second logic module may be configured to operate the robotic apparatus in accordance with a target trajectory characterized by the performance parameter. The third logic module may be configured to (1) adjust an instantaneous cost value and (2) determine an updated cost function configured to transition the performance parameter towards the target value, the updated cost function being based on an initial cost function associated with the performance parameter and the adjusted instantaneous cost value.

In some implementations, the training apparatus may comprise a remote evaluation apparatus configured to communicate with the robotic apparatus via one or more of radio waves, sound waves, infrared waves, or visible light waves.

In some implementations, the remote evaluation apparatus may comprise a first button and a second button. The first button may be configured to facilitate communication of positive reinforcement to the robotic apparatus based on performance associated with the performance parameter being within a given range. The second button may be configured to facilitate communication of negative reinforcement to the robotic apparatus based on the performance being outside the given range.

In some implementations, the system may comprise a user interface apparatus configured to present information associated with a training history. The training history may comprise information associated with (1) timing of one or more events associated with receipt of one or more training signals and (2) magnitude of adjustment of the instantaneous cost associated with individual ones of the one or more events.

In some implementations, the target trajectory may be characterized by at least one state parameter. The user interface apparatus may be configured to enable modification of the training history. The modification may comprise one or more of (1) addition of another event associated with another training signal, (2) removal of at least one existing event, or (3) adjustment of a value of the state parameter associated with the event.

In some implementations, the state parameter may comprise a motion characteristic of the robotic apparatus. The history modification may comprise a transformation of the instantaneous cost associated with a given event into the motion characteristic.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Figure 1:
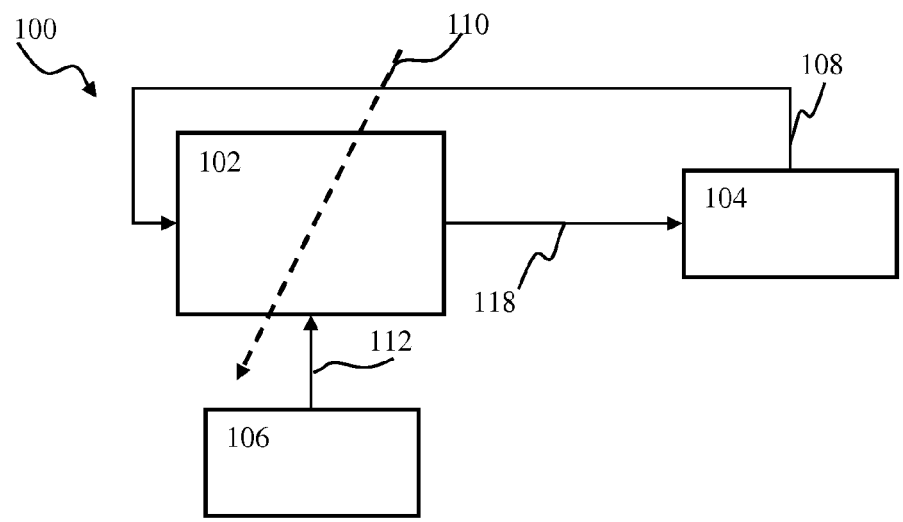
FIG. 1 is a block diagram illustrating a generalized adaptive robotic apparatus for use with the training methodology, in accordance with one or more implementations.

All Figures disclosed herein are © Copyright 2013 Brain Corporation. All rights reserved.

DETAILED DESCRIPTION

Exemplary implementations of the present disclosure will now be described in detail with reference to the drawings, which are provided as illustrative examples so as to enable those skilled in the art to practice the disclosure. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or similar parts.

Where certain elements of these implementations can be partially or fully implemented using known components, only those portions of such known components that are necessary for an understanding of the present disclosure will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" are meant to refer, without limitation, to a network unit (e.g., a spiking neuron and a set of synapses configured to provide input signals to the neuron) having parameters that are subject to adaptation in accordance with a model.

As used herein, the terms "state" and "node state" is meant generally to denote a full (or partial) set of dynamic variables used to describe node state.

As used herein, the term "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

The present disclosure provides, among other things, a computerized apparatus and methods for facilitating training of robotic devices using reinforcement. In some implementations, an object of the training is to enable the robotic device to move like an animal.

FIG. 1 illustrates one exemplary adaptive control system useful to the disclosure. The system 100 shown in FIG. 1 may comprise an adaptive controller apparatus 102, a plant 104, a sensor block 106 and/or other components. The plant 104 may comprise an unmanned robotic vehicle, drone, and/or other plants.

The controller apparatus 102 may be configured to receive sensory input from the sensor block 106 and a feedback 108 from the plant 104. In some implementations, the feedback signal may comprise one or more of a control plane position, motor speed and/or current, remaining battery level, status of feedback motors and/or actuators, and/or other parameters (e.g., motor commands actually sent to the plant). Within the framework of adaptive control, the sensory signal 112 and the feedback 108 may be referred to as the sensory input, as they describe inputs to the control process.

In some implementations, the input signal may comprise data x(t) used for solving a particular control task. In one or more implementations, such as those involving a robotic arm or autonomous robot, the signal x(t) may comprise a stream of sensor data, generated, for example, by the sensor block 106 in FIG. 1. In some implementations, the sensor data may comprise a raw sensor stream. Examples of the raw sensor stream may include data relating to one or more of proximity, inertial, terrain imaging, and/or other data. In one or more implementations, the sensor data may comprise preprocessed data. Examples of preprocessed data may include one or more of velocity, extracted from accelerometers, distance to obstacle, positions, and/or other preprocessed data. In some implementations, such as those involving object recognition, the signal x(t) may comprise an array of pixel values (e.g., RGB, CMYK, HSV, HSL, grayscale, and/or other pixel values) in the input image, and/or preprocessed data (e.g., levels of activations of Gabor filters for face recognition, contours, optic flow and/or other preprocessed data). In one or more implementations, the input signal x(t) may comprise desired motion trajectory, for example, in order to predict future state of the robot on the basis of current state and desired motion.

The controller apparatus 102 may be configured to provide control output 118 (e.g., motor commands) to the plant. The controller may be operable in accordance with a learning process configured to perform one or more tasks (e.g., locate a target, gather all pieces of garbage, and/or other tasks). The learning process may be configured based on a control policy that may be used to produce control output 118. In some implementations, the policy may comprise one or more criteria such as lowest energy, fastest time, smallest instantaneous error, maximum speed within bounds, and/or other parameters. The policy may be based on an objective function. A feasible solution that minimizes (or maximizes, if that is the goal) the objective function may be referred to as an optimal solution. In some implementations, the objective function F may be referred to as the cost function (minimization), cost to go, indirect utility function (minimization), utility function (maximization), energy function, energy functional, and/or other terms relating to the objective function F.

Figure 2:
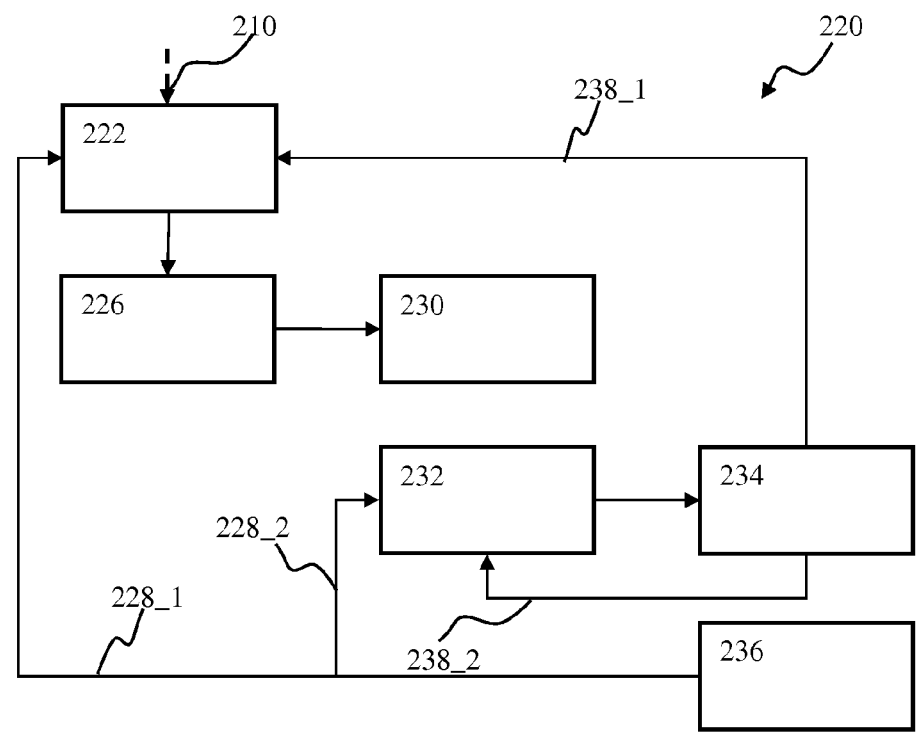
FIG. 2 is a block diagram illustrating an adaptive robotic apparatus comprising a cost function constructor for use with the training methodology based on reinforcement, in accordance with one or more implementations.

The cost function F may be shaped by one or more instantaneous cost C inputs associated with the operation of the robotic device. In some implementations, such as illustrated in FIGS. 1-2, instantaneous cost may be determined based on a reinforcement input 110 provided by an external agent during training of the adaptive systems 100, 220. The external agent may comprise a human and/or computerized operator communicating supervisory signal via, for example, remote commands. The commands may be effectuated based on, for example, robotic device approaching a target, an area of danger (an obstacle), device reaching of a pre-configured condition (e.g., a safety constraint of speed in excess of 5 m/s), and/or other criteria.

FIG. 2 illustrates the use of reinforcement input to form cost function during training of an adaptive system 220. The system 220 may comprise a controller 232 configured to generate control output for plant 234 based on sensory input 228$_{-2}$ from sensor block 236 and/or plant feedback 238$_{-2}$. The system 100 may be operable in accordance with a cost function f, depicted by the cost function block 226 in FIG. 2. The cost function 226 may be utilized by controller constructor block 230 adapted to configure a realization of the controller 232 and form a control policy. For example, the controller construct block may utilize the cost function by computing its gradient and setting the control policy in accordance with the gradient of the cost function. In another implementation the controller construct block may use the cost function to update parameters of the controller. In some implementations, the controller construct block may execute one (or more) trials using different parameters of the controller over a trajectory. Based on values for the cost function obtained during these, a determination may be made as to which control parameters should be utilized during controller operation.

In some implementations, the controller realization may be comprise a reinforcement learning process effectuated by spiking neural networks (e.g., as described in co-pending and co-owned U.S. patent application Ser. No. 13/489,280 entitled "STOCHASTIC SPIKING NETWORK APPARATUS AND METHOD", filed Jun. 5, 2012, incorporated herein by reference in its entirety):

$$\frac{d\theta_i(t)}{dt} = \eta(t)F(t)e_i(t), \quad \text{(Eqn. 1)}$$

where:
 $\theta_i(t)$ is an adaptation (learning) parameter of a synaptic connection between the pre-synaptic neuron i and the post-synaptic neuron j;
 $\eta$ is a parameter referred to as the learning rate, $\eta$ can be a constant parameter or it can be a function of some other system parameters;
 F(t) is the cost function (the cost-to-go function in some implementations); and
 $e_i(t)$ is eligibility trace, configured to characterize the relations between pre-synaptic and post-synaptic activity.

The cost function 226 may be configured by the cost function constructor 222 based on the reinforcement signal 210, sensory input 228$_{-1}$ and/or plant feedback 238$_{-1}$ and expressed as follows:

$$F=F(q(t),r(t)t), q(t)=q(x(t),y(t)), \quad \text{(Eqn. 2)}$$

where:
 q(t) denotes controller state;
 x(t) denotes sensory input;
 y(t) denotes plant feedback; and
 r(t) denotes reinforcement input.

The reinforcement signal 210 may include positive and/or negative reinforcement signals and/or other types of reinforcement and/or reward signals. In some implementations, the reinforcement signal may comprise sensor input from the environment (e.g., a perimeter beacon alarm and/or other input) and/or a sensor on the robotic device (e.g., a proximity alarm and/or other input).

Whereas the reinforcement signal 210 may provide an input for the adaptive system 220, the reinforcement signal 210 may be distinguished from the sensory inputs (e.g., the inputs 112, 108 in FIG. 1 and/or the inputs 238, 228 in FIG. 2) based on their use. The reinforcement signal 210 may be utilized by the control system (e.g., 100, 220) in order to determine the cost function F (e.g., by the cost constructor 222, in the implementation shown in FIG. 2). Once the cost function F and the controller realization is constructed (e.g., by the controller constructor 230 in FIG. 2), the reinforcement signal may not directly affect the operation of the controller 232.

The sensory inputs 112, 108 in FIG. 1 and/or the inputs 238, 228 in FIG. 2 may affect both: (i) the cost function 226 construction and (ii) the controller 232 operation. In one or more implementations, the sensory inputs may be utilized by the adaptive controller to update the control process through the eligibility trace (e.g., the eligibility trace e(t) term in Eqn. 1).

In one or more implementations, the cost function may be constructed based on one or more events associated with the reinforcement signal (e.g., 210 in FIG. 2). In some implementations, the agent providing the reinforcement signal may comprise a human operator communicating with the system 100, 220. In one or more implementations, the communication may be effectuating by audio signal (e.g., a clap), video signal (e.g., a card of a certain color), and a wireless communications device (e.g., radio, infrared) hereinafter referred to as the "clicker". In some implementations, the communication may be effectuated by a light beam of a remote device, as described in detail in co-pending and co-owned U.S. patent application Ser. No. 13/601,721 entitled "APPARATUS AND METHODS FOR CONTROLLING ATTENTION OF A ROBOT", filed Aug. 31, 2012, incorporated herein by reference in its entirety.

Figure 6:
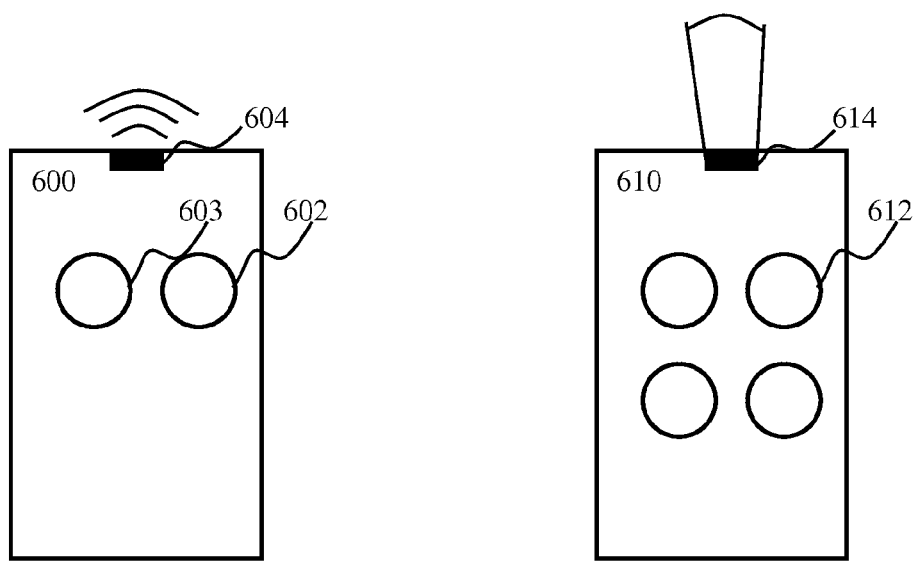
FIG. 6 is a block diagram illustrating a clicker apparatus for controller system, in accordance with one or more implementations.

FIG. 6 illustrates exemplary implementations of clicker apparatus 600, 610 useful to for communicating information to an adaptive system (e.g., the systems 100, 220 of FIGS. 1-2) during training. In some implementations, the adaptive system may comprise a robotic apparatus (e.g., a robot). In one or more implementations, the adaptive system may comprise a computer apparatus and/or a machinery to be trained. A computer apparatus may include training the operating system of the computer to perform some desired functions or avoiding others; it may be training one or multiple application, alone or to work together. A machinery may consist of an exoskeleton configured to help walking, or carrying, lifting heavy loads. It may include an adaptive controller for a computer numerical control (CNC) industrial machine configured to learn machining a part in a particular way without the use of programming. In some realizations, the adaptive controller may be realized on a server configured to implement a virtual environment, such as a virtual world.

The clicker apparatus 600 may comprise one or more buttons 602, 603 configured to provide reinforcement indication. In some implementations, individual buttons 602, 603 may be configured to provide positive and negative reinforcement signals (e.g., "good", "bad"), respectively. In some implementations, individual buttons 602, 603 may be configured to provide different degrees or ranges of positive and/or negative reinforcement signals (e.g., "excellent", "good", "bad", and "very bad"; a number between 1 and 5; and/or other degrees or ranges). The clicker apparatus 600 may comprise two pairs of buttons 612. Two individual buttons 612 of FIG. 6 may be configured to provide different degrees of positive reinforcement (e.g., "excellent", "good"). The other two individual buttons 612 of FIG. 6 may be configured to provide different degrees of negative (e.g., "bad", "very bad").

The clicker apparatus 600, 610 may comprise a wireless communications interface 604, 614. In some implementations, the interface 604 may comprise one or more of a radio frequency interface, a sound wave interface, an infrared interface, and/or other interfaces. In some implementations, the interface 614 may comprise an electromagnetic wave (e.g., visual light) interface.

FIGS. 3A-5 illustrate the use of a clicker device during training of an adaptive system (e.g., 220 of FIG. 2) in order to build a cost function F(q,t) (e.g., 226) that may be utilized by the controller constructor in order to improve performance of the adaptive system. In one or more implementations, performance improvement may be determined based on a decrease in the cost function over the same and/or similar trajectory or during execution of the task(s).

In some implementations, the system 220 may comprise a robotic device comprising one or more artificial limbs (e.g., legs, manipulators, and/or other limbs). The cost function F(q,t), may be used in order to smooth out movements of the robot and/or to make the movements to appear more natural looking and/or to make them more "human-like" or more "animal-like".

Figure 5:
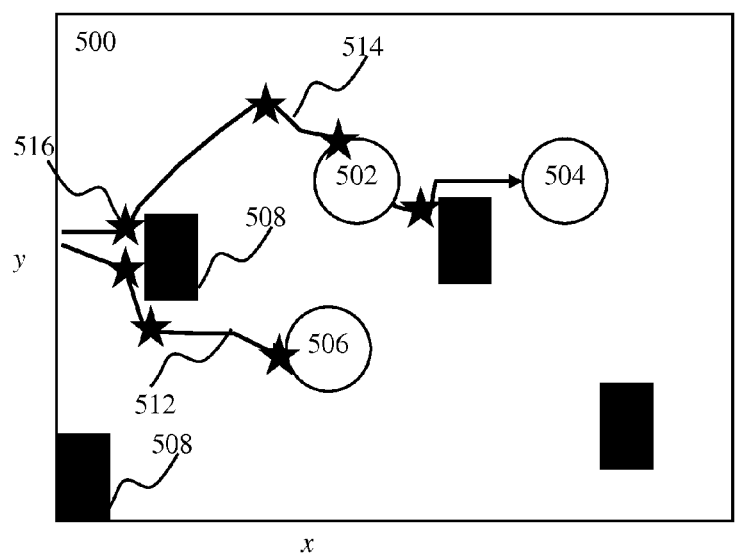
FIG. 5 is a graphical illustration depicting exemplary trajectories of a robotic device during training, in accordance with some implementations.

FIG. 5 depicts exemplary trajectories of an adaptive apparatus useful in illustrating principles of the cost function design methodology of the disclosure. As used herein, the cost function F(q,t) may be configured as the cost-to-go. The cost-to-go may be described as a cumulative of immediate costs $C_i$ along a trajectory (e.g., the trajectory 512, 514 in FIG. 5) of the robotic device and/or when following an action policy, from a start or intermediate point to a finish point.

The trajectory may be associated with an environment (e.g., denoted by a rectangle 500 in FIG. 5). The policy may be configured such that one or more areas within the environment may be avoided (e.g., obstacles 508) and one or more areas (e.g., targets 502, 504, 506) may be targeted. In some implementations, the targets may be associated with positive reinforcement and obstacles may be associated with negative reinforcement.

In some implementations, a policy may comprise providing the adaptive apparatus (e.g., a robot) with an exemplary trajectory over which the robot is directed to follow as close as possible and/or points to which the robot is directed to reach during its path to the goal.

Similarly as humans do when teaching other humans, training of adaptive robotic devices using demonstration and/or reinforcement learning may aid in placing the robot at an appropriate starting point and selecting an optimal trajectory.

Clicker training described herein may be configured to enable an external agent (e.g., the teacher) to communicate an immediate cost $C(x, t_i)$ at time t, to the robotic controller. The teacher may, based on observing operation of the adaptive apparatus, provide feedback via the reinforcement signal.

In some implementations (e.g., illustrated in FIG. 6), the clicker 610 may comprise four buttons 612. One pair of buttons may be used to provide positive reinforcement while another pair of buttons may be used to provide negative reinforcement. For positive or negative reinforcement, one button within the pair may be used to indicate hard constraints while the other button within the pair may be used to indicate soft constraints. In one or more implementations, the hard positive reinforcement may correspond to points along robot trajectory of operation that the robot must absolutely pass by or through (e.g., fuel station, docking station, and/or a target). The hard negative reinforcement may correspond to points along robot trajectory of operation that the robot absolutely must avoid (e.g., a cliff, an obstacle, a mine, hitting a part of robot body, and/or other points). The soft constraint may be used to indicate desirable areas for the robot to approach or areas that are not desirable. In one or more implementations of target approach training: reaching the final goal may correspond to a hard positive reinforcement; approaching the target along an acceptable trajectory may correspond to soft positive reinforcement; going away from the target may correspond to a hard negative reinforcement; and deviation from the acceptable trajectory may correspond to a soft negative reinforcement.

In some implementations involving a human trainer, one button pair may be activated by the left hand while the other pair may be operated the right hand. It will be appreciated by those skilled in the arts that the clicker realizations illustrated and described with respect to FIG. 6 are exemplary and various other clicker implementations comprising fewer (e.g., a single button) and/or more buttons may be utilized as well. Examples of other clicker implementations may include one or more of a touch phone interface of a tablet, smartphone, and/or other clicker implementations.

In applications where the trainer may comprise a computerized apparatus, the clicker may be embedded within the trainer apparatus. Such a "virtual" clicker may be configured to provide varying degrees of reinforcement gradations.

The hard constraints may be used by the trainer to indicate initial and/or final points of a trajectory of a movement. The hard constraints may be used by the trainer to indicate cognitive sensorimotor states which are to be reached or avoided. The hard constraints may be used to indicate intermediate points that the adaptive controller is to pass by or through (e.g., a target destination, a detour point in order to go around an obstacle, and/or other intermediate points).

The soft buttons may be used to indicate that the adaptive system is doing well or poorly, and/or whether the behavior that led to the reinforcement should be repeated or avoided in the future.

Voice activated feedback may be utilized to provide reinforcement signal. In some implementations, words or short phrases may be used. Examples of such phrases may include one or more of "excellent", "very good", "good", "bad", "very bad", "oh! never do that again", and/or other phrases. In one or more implementations, the loudness and/or intonation of a voice command may be used to indicate the magnitude of the feedback.

In some implementations, a continuous value may be used to describe the feedback. For example, a continuous value may on a continuum from −1 to +1, where −1 is the largest negative reinforcement and +1 is the largest positive reinforcement. In some implementations, a joystick may be used to report a continuous value as feedback (e.g. most left at −1 and most right at +1).

In implementations comprising a gesture recognition interface, the feedback may be given by moving arms, head, facial expressions, and/or other gestures. For example, "yes" (for positive reinforcement) may be indicated by moving the head up and down, while "no" (for negative reinforcement) may be indicated by moving the head left to right. The velocity of the movement of the gesture may indicate the magnitude of the desired feedback.

Various encoding approaches may be utilized in order to encode a value of the reinforcement signal. In some applications where a cost function is to be minimized (e.g., traverse a trajectory in shortest time and/or with lowest fuel use), the instantaneous cost $C(q,t)$ may be configured equal 0 for the most positive feedback and +1 for the most negative feedback. In some implementations, the most negative feedback may be set to a large positive number, such as $10^8$.

In one or more implementations aimed, for example, at improving computational efficiency, the following transformation may be applied to the instantaneous cost $C(q,t)$, where:

$$\hat{C}(q,t)=\exp(-LC(q,t)).\quad\text{(Eqn. 3)}$$

The instantaneous cost may be configured so that $\hat{C}(q,t)=1$ for $C(q,t)=0$, 1 for Cost=0 and $\hat{C}(q,t)\to 0$ as $C(q,t)\to\infty 1$. In Eqn. 3, L denotes a decay parameter. The transformed $\hat{C}(q,t)$ may be subsequently used for constructing cost function $F(q,t)$.

Figure 3A:
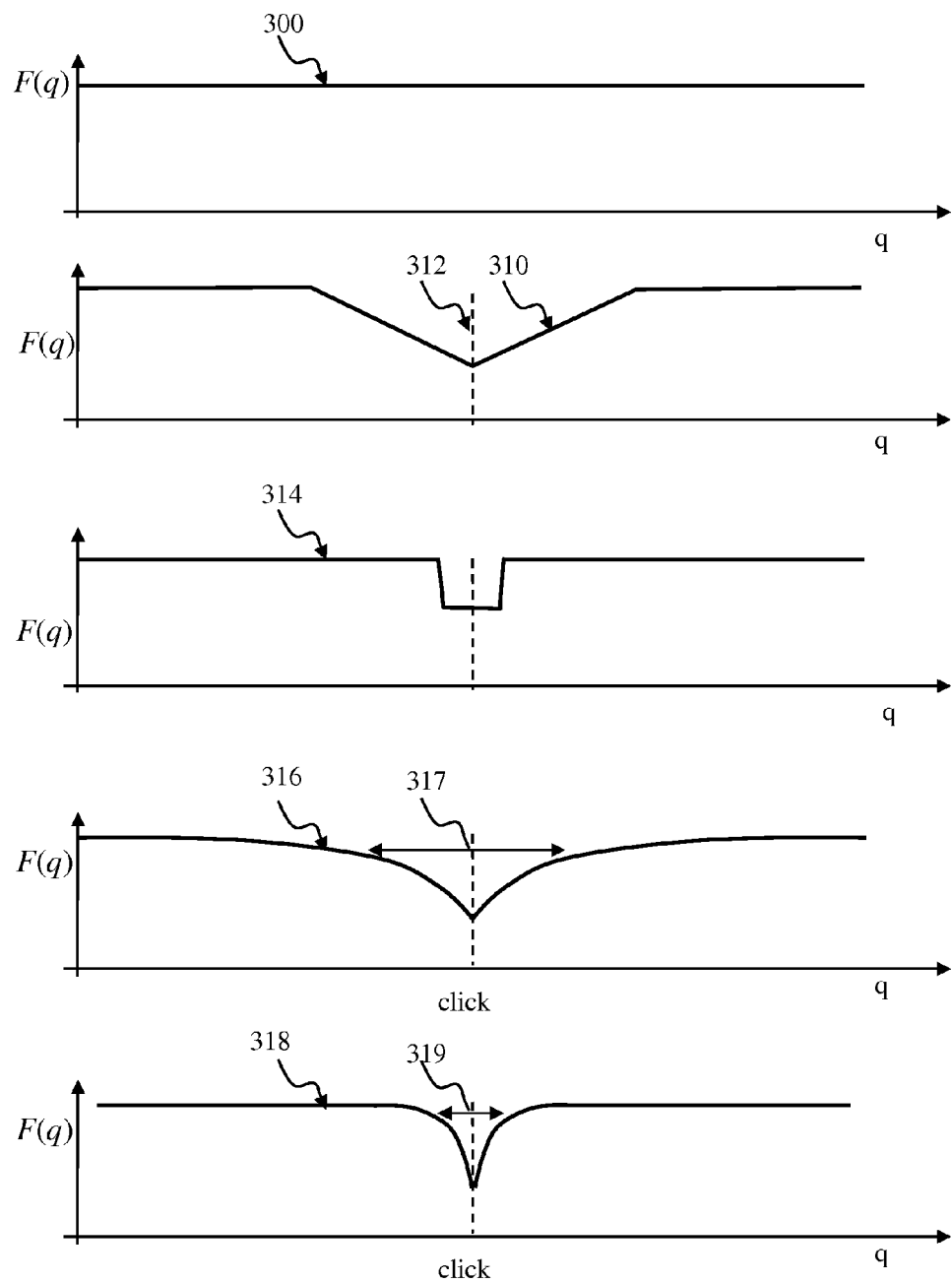
FIG. 3A is a plot illustrating cost function versus state during training of an adaptive controller comprising positive reinforcement, in accordance with some implementations.
Figure 3B:
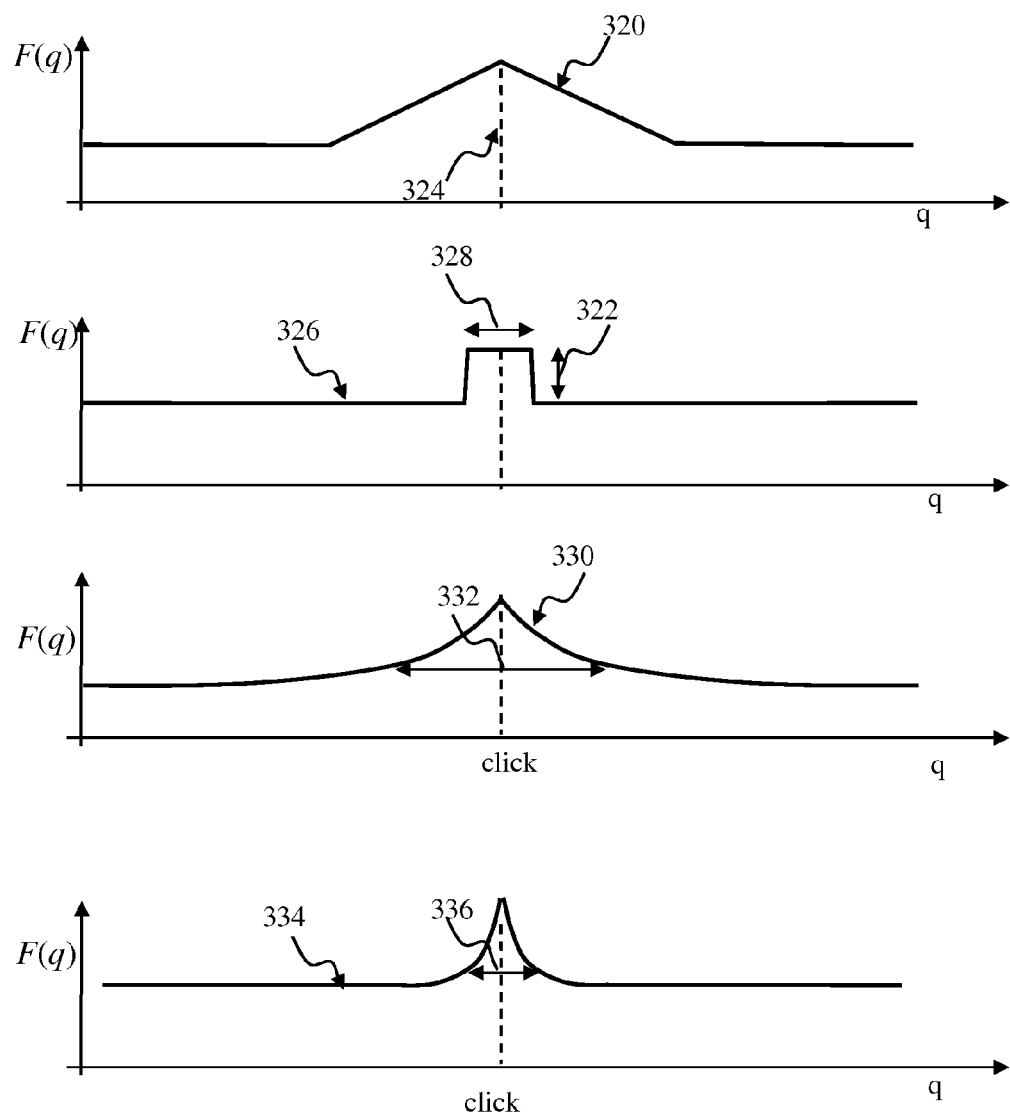
FIG. 3B is a plot illustrating cost function versus state during training of an adaptive controller comprising negative reinforcement, in accordance with some implementations.
Figure 3C:
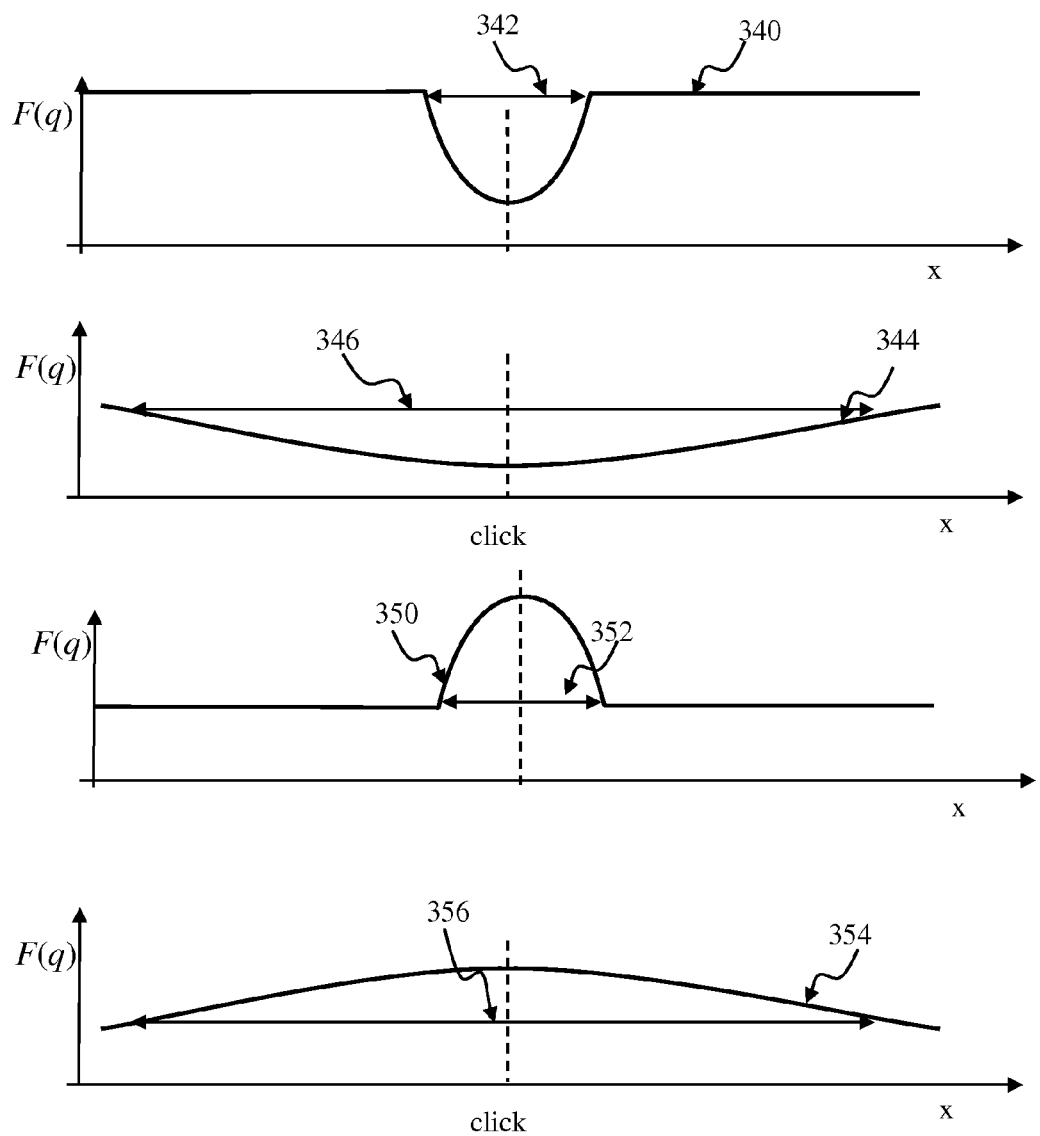
FIG. 3C is a plot illustrating cost function versus state during training of an adaptive controller comprising Gaussian cost adjustment due to reinforcement, in accordance with some implementations.
Figure 4:
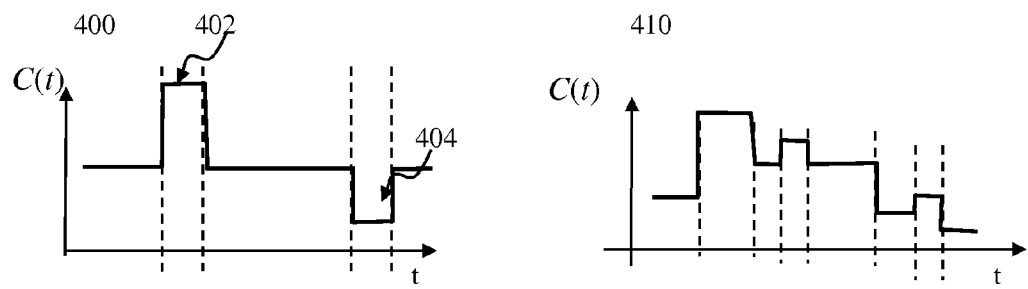
FIG. 4 is a plot illustrating cost function versus time corresponding to a training trajectory of a robotic device comprising positive and negative reinforcement, in accordance with some implementations.

FIGS. 3A-4 illustrate modification of instantaneous cost $C(q,t)$ during training of the adaptive system. In some implementations, the curves shown in FIGS. 3A-4 may correspond to a trajectory of a robot (e.g., 512, 514 of FIG. 5).

FIG. 3A depicts $C(q,t)$ as a function of the state parameter q corresponding to positive reinforcement that may be received when, e.g., the robot approaches a target area. In one or more implementations, the state parameter q may correspond to a spatial coordinate x and/or y and or other characteristic such as velocity, acceleration along these spatial coordinates, or visual, auditory, and/or motor signals. The curve 300 in FIG. 3A denotes a base level of cost in absence of reinforcement. The broken vertical lines (e.g., 312) in FIG. 3A denote instances when the reinforcement (e.g., click) is received. The curves 310, 314, 316, 318 depict cost decreases due to receipt of positive reinforcement. Curves 316, 318 illustrate use of exponential cost function adjustment as a function of state distance from the state at the clock event. The adjustment of curve 316 is characterized by a larger state space adjustment width 317 (e.g., 3 times in the example of FIG. 3A) compared to the state space adjustment width 319 of the curve 318.

FIG. 3B depicts $C(q,t)$ as a function of the state parameter q corresponding to negative reinforcement that may be received when, e.g., the robot approaches an obstacle and/or an area to be avoided. The broken vertical lines (e.g., 324) in FIG. 3A denote instances when the reinforcement (e.g., click) is received. The curves 320, 326, 330, 334 depict cost increases due to receipt of negative reinforcement. Curves 330, 336 illustrate use of exponential cost function increase as a function of state distance from the state associated with the clock event. The adjustment of the curve 330 is characterized by a larger state space adjustment width 332 (e.g., 3 times in the example of FIG. 3B) compared to the state space adjustment width 336 of the curve 334.

FIG. 3C depicts $C(q,t)$ as a function of the state parameter q corresponding to negative (curves 350, 354) and positive reinforcement (curves 340, 344) comprising Gaussian dependence of the cost adjustment on state distance from the state associated with the click event. The adjustment of curves 344, 354 is characterized by a greater state space adjustment width 346, 356 (e.g., 3 times in the example of FIG. 3C) compared to the state space adjustment width 342 352 of curve 340, 350, respectively. In some implementations that may require a rapid cost change in, for example, vicinity of an object (e.g., for obstacle avoidance) cost modification may be configured using exponential distribution (e.g., curves 330, 334 in FIG. 3B). In some implementations that may require wider state extend and more gradual cost changes, cost modification may be configured using Gaussian distribution (e.g., curves 340, 344, 350 in FIG. 3C).

The curves presented in FIG. 3A-3C illustrate non-exhaustively different possibilities of generalizing the immediate cost function around a clicker training point.

Individual modifications of instantaneous cost may be characterized by magnitude (e.g., 322 in FIG. 3B) and spatial extent (e.g., 328 in FIG. 3B). In some implementations, the magnitude may be configured based on the level of the reinforcement feedback (e.g., soft, hard, and/or other gradations as discussed above with respect to FIG. 6). In one or more implementations, the extent along the state coordinate q may correspond to, for example, spatial area of the obstacle, and/or be configured in accordance with traces of state coordinate activity, or the region in which previous changes occurred, or more generally, or regions that may be predictively associated with the clicked state coordinate and/or another parameter.

Curves 400 410 in FIG. 4 illustrate time evolution of instantaneous cost C(q,t) along a trajectory (e.g., 512, 514 in FIG. 5). The reinforcement input by the trainer (e.g., via the clicker) may cause increases (e.g., 402) due to the robot approaching an obstacle (e.g., 508 in FIG. 5) and/or decreases (e.g., 404) due to the robot approaching a target area (e.g., 506 for the trajectory 512 in FIG. 5).

The adaptive system (e.g., 100 of FIG. 1) may be operated in accordance with a reinforcement algorithm (RL) process. In some implementations, the RL algorithm may comprise a path integral policy iteration with a cost function F(q,t) determined as:

$$F(q,t)=F^{RL}(q,t)+F^{P}(q,t), \quad \text{(Eqn. 4)}$$

where:
$F^{RL}(q,t)$ denotes the cost function portion determined by the clicker training (described above); and
$F^{P}(q,t)$ denotes the cost function portion determined according to requirements of the control policy.

The control policy may comprise one or more of minimizing energy, minimizing jerk along a trajectory, making movement of the robot to resemble animal- or human-like movements, and/or other criteria. As used herein the term "jerk" is used to refer to a temporal derivative of acceleration (e.g., curve 720 shown in FIG. 7) associated with motion of the robot.

The cost function $F^{P}(q,t)$ of the control policy may be constructed using one or more of the following constraints:
for applications to train the robot to exhibit animal/human like movement:
constraint on jerk and/or higher order derivative terms;
constraint on drive described below with respect to Eqn. 9; and/or
constraint on energy.
For hard constraint for a trajectory:
for a given number of degrees of freedom, individual state corresponding to the use of the clicker may be associated with a high cost (negative reinforcement) and/or small or zero cost (positive reinforcement)
For a policy configured to minimize cost:
An increase in cost-to-go or immediate cost may comprise a "negative reward" and a decrease may comprise a "positive reward";
In implementations where $q_{click}$ state may be associated with a change in immediate cost $C(q_{click},t)$:
positive reinforcement may decrease the cost at the click point C(click+):

$$C(q_{click},t+\Delta t)=C(q_{click},t)-GC(q_{click},t), \quad \text{(Eqn. 5)}$$

negative reinforcement may increase the cost at the click point C(click−):

$$C(q_{click},t+\Delta t)=C(q_{click},t)+GC(q_{click},t), \quad \text{(Eqn. 6)}$$

where:
G is a parameter that may depend on the magnitude of the feedback provided, such that, e.g., G(very bad)>G(bad) and similarly, G(very good)>G(good);

$C(q_{click},t+\Delta t)$ denotes the updated instantaneous cost; and
$C(q_{click},t)$ denotes the initial instantaneous cost prior to reinforcement.

The updated immediate cost may be back propagated to states experienced previously using a variety of techniques, such as dynamic programming, temporal-difference learning (TD), and/or accounting for in the cost function along a full trajectory, such as in the Path Integral for Policy Iteration (PI2)

In some implementations, the immediate cost may be affected in the state space vicinity of the clicker point (e.g., the extent 328, 332, 336 in FIG. 3B). The extent may be localized (e.g., 328) and/or span a greater portion of the state space (e.g., global change) illustrated by the extent 356 of the curve 354 in FIG. 3C.

In some implementations where reinforcement comprises a "hard click" (e.g., as described above), instantaneous cost adaptation may be performed as follows: based on a positive reinforcement configured decrease the cost at the click point a curve may be applied to the C(q,t) in the range of q form $q_{click}-q1$ to $q_{click}+q2$), where q1++q2=$\Delta$q denote the state extent (e.g., 332 in FIG. 3B). The curve may comprise a parabola, and expressed as:

$$C(q,t+\Delta t)=C(q,t)-A(q_{click}-q)^2-B,$$

$$q \in [q_{click}-q1, q_{click}+q2], \text{ and}$$

$$q1++q2=\Delta q, \quad \text{(Eqn. 7)}$$

where A and B are positive constants. In some implementations, such positive constants may be defined as A=$10^4$, or $10^8$ and B=0. The parameters A, B may be configured as a function of the magnitude of G(reinforce). For example, the parameters A, B may be configured such that A may increase as G increases and B may decrease as G increases. One or more curves (e.g., of Eqn. 7) may be applied to individual dimensions (e.g., degrees of freedom) of the state space.

In one or more implementations, the instantaneous cost adaptation for the new cost may be set to zero at $q_{click}$ and to a large value for states away from $q_{click}$. In one such realization responsive to the instantaneous cost being bounded between zero and one, the large value may comprise the value of one. In the case of the instantaneous cost unbounded, the large value may be selected equal $10^8$.

In some implementations, the function may comprise a sharp convex function (e.g., a Gaussian). Such a function may be an increasing function away from $q_{click}$ and may saturate after a distance $\Delta q$ from $q_{click}$. The choice of function may be based on whether the positive points should have an effect on a large region of states or rather should be more local in state space. In some implementations wherein arm movements are configured more general and independent of final arm position, a local region may be selected. In implementations wherein comprising teaching of a few trajectories to few specific locations, a larger region may be selected.

In some implementations where reinforcement comprises a "hard click" (e.g., as described above), instantaneous cost adaptation may be performed as follows: based on a negative reinforcement configured increase the cost at the click point a curve may be applied to the C(q,t) in the range of q form $q_{click}-q1$ to $q_{click}+q2$), where q1+q2=$\Delta$q denote the state extent (e.g., 343 in FIG. 3B). The curve may comprise a parabola illustrated by the curve 344 and expressed as:

$$C(q,t+\Delta t)=C(q,t)+A(q_{click}-q)^2+B,$$

$$q \in [q_{click}-q1, q_{click}+q2], \text{ and}$$

$$q1++q2=\Delta q, \quad \text{(Eqn. 8)}$$

where A and B are positive constants. The parameter B may be used to provide a large cost (e.g., B=$10^8$) when q is at $q_{click}$.

The parameters A, B may be configured as a function of the magnitude of G(reinforce), for example such that A may increase as G increases and B may decrease as G increases. One or more curves (e.g., of Eqn. 7) may be applied to individual dimensions (e.g., degrees of freedom) of the state space.

In one or more implementations, instantaneous cost adaptation the new cost may be set to a large value at $q_{click}$ and to zero for states away from $q_{click}$.

Various other functions (e.g., sharp concave functions) may be utilized, in accordance with some implementations.

In implementations where reinforcement comprises a "soft click" (e.g., as described above), instantaneous cost adaptation may be performed based on general methodology of Eqn. 7-Eqn. 8 described above. The modulation parameters G, A, B for the soft constraint implementations may be selected to produce smaller changes in the instantaneous cost, compared to the hard constraint implementations. The concave/convex functions may also be configured not to cause abrupt changes in the (e.g., derivative dC(q,t)/dq<R_soft<R_hard, wherein R_soft/R_hard may be configured between 1/1000 and 1.

In some implementations, the immediate cost C(q,t) configured based on, inter alia, reinforcement input from teacher, described above with respect to FIGS. 3A-4, may be utilized to determine cost function (e.g., by the cost constructor 222) for use by a controller in order to cause robot movements to resemble movements of humans and/or animals. The immediate cost may contain other information that may be relevant to the task and target outcome (e.g., as minimization of energy, or passing around an obstacle).

In an implementation configured to control the end of a limb (e.g., a hand, finger, foot, or toe) in a human-like manner, the cost-to-go for one movement i may be described as:

$$C_i^*(\mathcal{D}, \ldots) = \min_T[C_i(T, \ldots) + \mathcal{D} \cdot T], \quad \text{(Eqn. 9)}$$

where the duration of individual movement is given by:

$$T_i(\mathcal{D}, \ldots) \equiv \frac{\partial C_i^*}{\partial \mathcal{D}}, \quad \text{(Eqn. 10)}$$

$\mathcal{D}$ denotes the drive and is a constant of the movement. The drive value may be changed to change the character of the movement, for example from a slow, sluggish movement to an energetic movement. The drive, although it can change, may be typically decided beforehand. An agent hand movement may be desired to be energetic, such as in karate agent moves, or perhaps slow for some movements of a ballerina agent. $C_i(T, \ldots)$ is the cost constraining the movement besides the drive, such that the hand moves through a particular point or towards a target, and how it may move to get there. The dependence on a range of arbitrary variables besides T is indicated by the three dots, " . . . ".

The total cost for multiple movements may be simply the sum of the individual movements:

$$F^*(\mathcal{D}, \ldots) = \Sigma_{i=1}^N F_i^*(\mathcal{D}, \ldots). \quad \text{(Eqn. 11)}$$

Note that one form for the cost may be taken as $$F_i(T, \ldots) = \int_0^T C_i(t, \ldots) dt, \quad \text{(Eqn. 12)}$$

where $c_i(\ldots)$ are the immediate costs.

Figure 7:
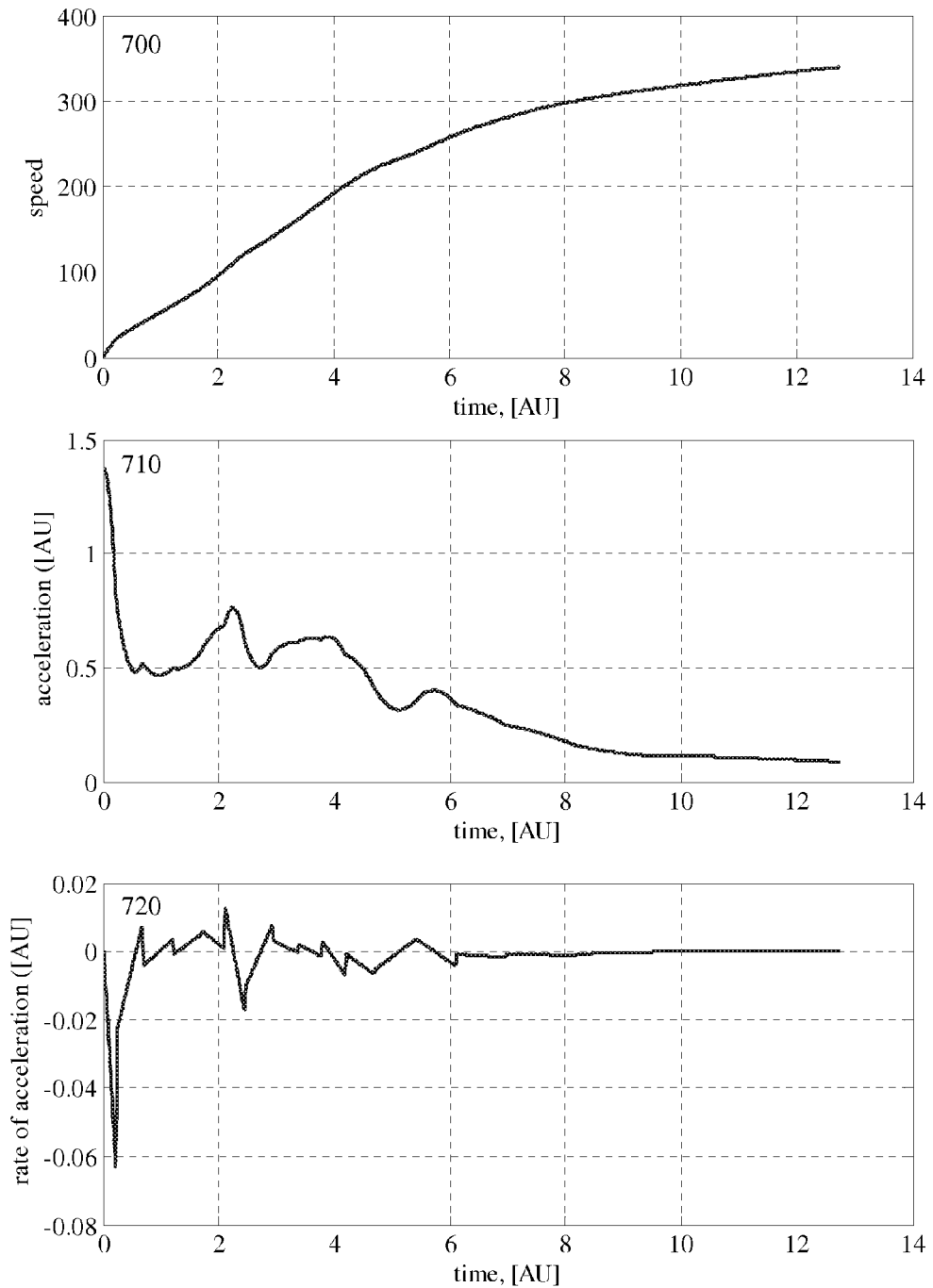
FIG. 7 is a plot illustrating movement of a robotic apparatus configured for use with the cost function methodology of the disclosure, in accordance with one or more implementations.

In some implementations, a squared-jerk immediate cost may be utilized in order to determine the movement pattern. The squared-jerk immediate cost may be expressed as:

$$C_i = |\vec{v}|^2 = |\vec{r}|^2, \quad \text{(Eqn. 13)}$$

where v and r are the hand velocity and position, respectively. As shown in FIG. 7, even when the speed time series of a platform may appear smooth (curve 700) higher order derivatives (e.g., acceleration 710, and jerk 720) may exhibit pronounced variations.

The learning policy associated with optimizing the hand movement may be configured to minimize (i) the squared-jerk and (ii) the total time for the trajectory contemporaneously with one another. The drive conservation may be employed for time-invariant processes. In the implementation of the squared-jerk, the drive may be expressed as:

$$\mathcal{D} = \ddot{r}^2 - 2\dot{r}\frac{d\ddot{r}}{dt} + 2\dot{r}\frac{d^2\ddot{r}}{dt^2}, \quad \text{(Eqn. 14)}$$

and considered as a constant during the movements.

By way of a non-limiting illustration, for a movement at a velocity of 0.3 m/s and a travel distance r of 1 m, the drive $$\mathcal{D} = 3600\frac{r^2}{T^6},$$

with these values, the drive may be set at $\mathcal{D}$ =324. If a more energetic movement is desired, something ten times larger may be chosen, such as $\mathcal{D}$ =3240, or any arbitrary value to obtain the desired movement character. With this new drive, the average speed $v_0$ is about $0.3 \times \mathcal{D}^{1/6}$.

For a given drive, the desired movement may be determines using the following cost function:

$$F_i^*(\mathcal{D}, \ldots) = \min_T[F_i(T, \ldots) + \mathcal{D} \cdot T]. \quad \text{(Eqn. 15)}$$

In some implementations, the constraint of reaching a target may be added with the final velocity of zero at the target in addition to minimizing the square-jerk in the drive equation above. Because it may be desired that the presence of the target does not influence the character of the rest of the movement, constraints may be configured to take effect in an area proximate the target so as to avoid cost modifications away from the target. The target area may be characterized in a state-space, where state may comprise, for example, coordinate, velocity, energy, and/or other parameters.

Defining the following, $$I = e^{-0.5*\left(\frac{d}{d_0}\right)^2}, \quad \text{(Eqn. 16)}$$

which may take on value of one near the target and value of zero away. The term O may be expressed as:

$$O = 1 - e^{-0.5*\left(\frac{d}{d_0}\right)^2}, \quad \text{(Eqn. 17)}$$

which may take on value of zero near the target and value of one away, one may write the immediate costs in the following terms:

$$C_i = |\vec{v}|^2 + K_v\left(\frac{v}{v_0}\right)^2 I + K_P O \quad \text{(Eqn. 18)}$$

where the first term is the squared-jerk as above, the second term constraints a zero velocity at the target and the last term enforces the shortest path to the target, and $d_0$ is a distance from the target, which defines the accuracy near the target. $K_\nu$ and $K_P$ are constants weighting their relative constraints.

In one or more implementations, an optimal trajectory may be based on a minimization of the amount of efforts (energy) used during the trajectory. An immediate cost related to the power, energy, and/or work spent during the movement may be added. For example for a plurality of electric motors, the immediate cost may be expressed as:

$$C_i(t) = \Sigma_{i=1}^M K_e V_i(t) I_i(t), \qquad \text{(Eqn. 19)}$$

where $V_i(t)$ and $I_i(t)$ are respectively the voltage and current at the motor, M is the total number of motors, and $K_e$ may be used to describe motor efficiency. In some implementations, the immediate cost may be expressed as:

$$C_i(t) = \Sigma_{i=1}^M f(V_i(t), I_i(t)), \qquad \text{(Eqn. 20)}$$

where f( ) describes power characteristics of the motors.

In one or more implementations, the immediate cost may be determined based on minimization of work, expressed as:

$$W = \int F(l) dl, F = ma, \qquad \text{(Eqn. 21)}$$

where a denotes acceleration, and l denotes distance travel.

A computerized graphical user interface (GUI) may be utilized with the clicker methodology described herein. In some implementations, the GUI may be used to visualize and/or replay the clicker events along a trajectory (e.g., point 516 along trajectories 512, 514 in FIG. 5) points along that were clicked. The GUI may visualize cost associated with individual events (e.g., positive/negative reinforcement) and/or one or more plant control parameters (e.g., speed, acceleration, energy use).

The GUI may enable a user to remove and/or edit clicker events. In some implementations, the editing may comprise modifying one or more state parameters (e.g., x,y, coordinate, and/or acceleration in FIG. 5) of the controller. In one or more implementations, the editing may comprise increasing/decreasing the reward.

In one or more implementations, event editing may comprise transforming cost changes due to an event (e.g., click 312 in FIG. 3A) from one state variable (e.g., q=position) to another state variable (e.g., q=acceleration or velocity). Such transformations may be performed on a point by point basis, globally (all points), and/or based, for example, on an area of state space (e.g., all points within top left quadrant and/or with time between t1 and t2). Such editing methodology may enable the operator to evaluate individual training scenarios along the same trajectory without requiring repeat of training, thereby enabling to reduce training cost and/or duration.

The operator may utilize the GUI in order to associate the clicker events with a particular state of the robot (e.g., instances of acceleration greater than 1 m/s²).

In some implementations (e.g., perimeter security), training may be based on a position of the robot, while in one or more implementations (e.g., obstacle approach/avoidance) the training may be may be based on other parameters (e.g., velocity and/or acceleration). Accordingly, the interface may enable to more specifically associate the clicker event with one or more control states (general state, sensorimotor state, and/or cognitive states), which were active some time before the clicker event.

By way of a non-limiting example of obstacle avoidance: to be in a particular position away from the obstacle may not be is not as important (provided that the robot is not touching the obstacle) as the relative motion with respect to the object (e.g., velocity and/or acceleration). An operator may utilize the GUI to associate appropriate state parameters with the clicker event thereby accelerating learning.

In one or more implementations, the graphical portion of the interface may be constructed in a manner that may be similar to existing movie editing tools (e.g., iMovie®) and/or robot control tools (e.g., Gostai Lab http://www.gostai.com/products/studio/gostai_lab), which may permit the visualization of camera and/or other signals from the robot on a computer screen In some implementations, the GUI may be configured to visualize individual and/or global cost functions, permit direct modifications of cost functions, via programming and/or graphical interface.

In one or more implementations, the GUI may be utilized to add, remove, and/or replace trajectory starting point and/or target point (e.g., 504, 506 in FIG. 5) thereby enabling the operator to evaluate individual training scenarios along different trajectories.

Figure 8:
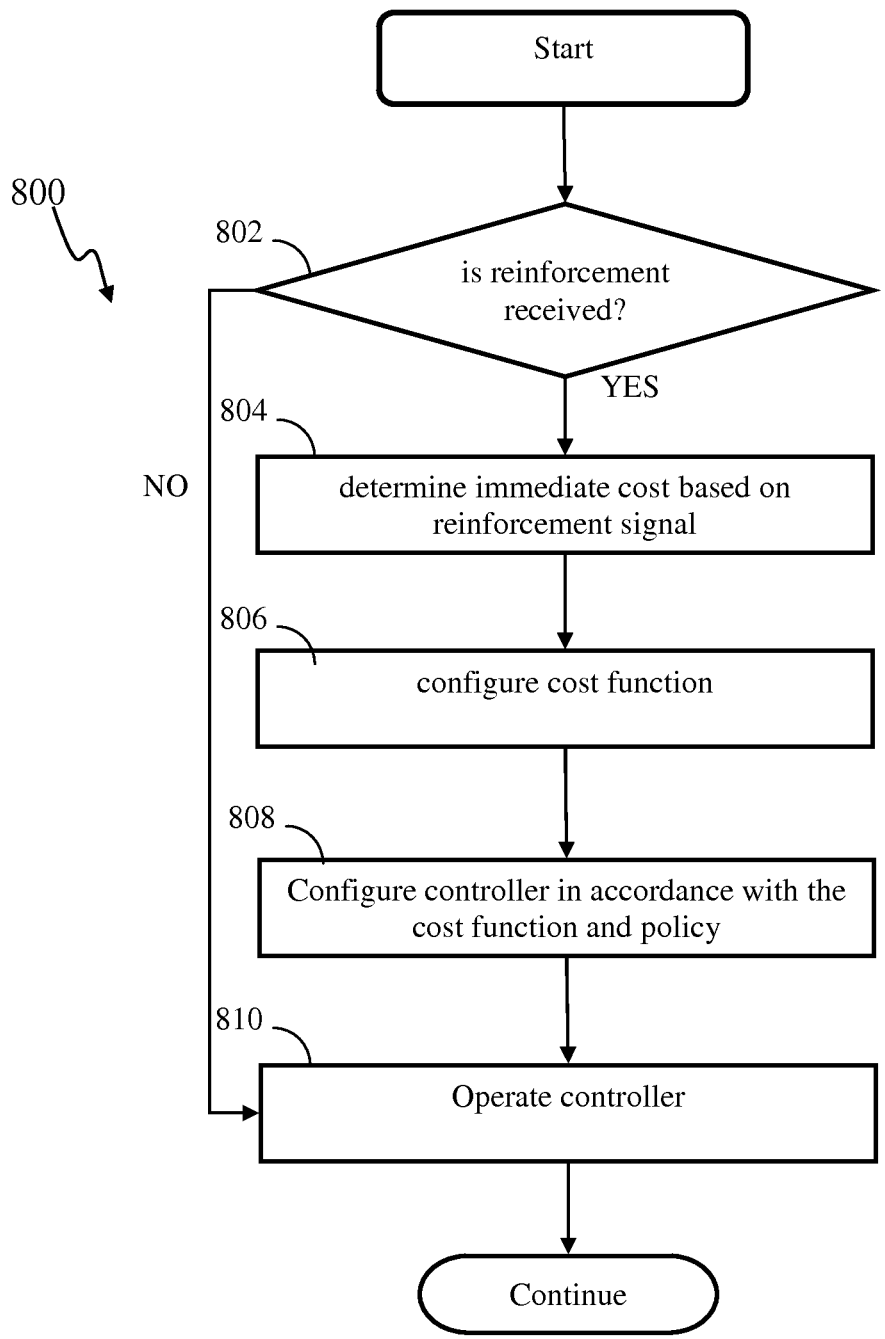
FIG. 8 is a logical flow diagram illustrating use of reinforcement learning configured to adjust cost function of an adaptive controller, in accordance with one or more implementations.
Figure 9:
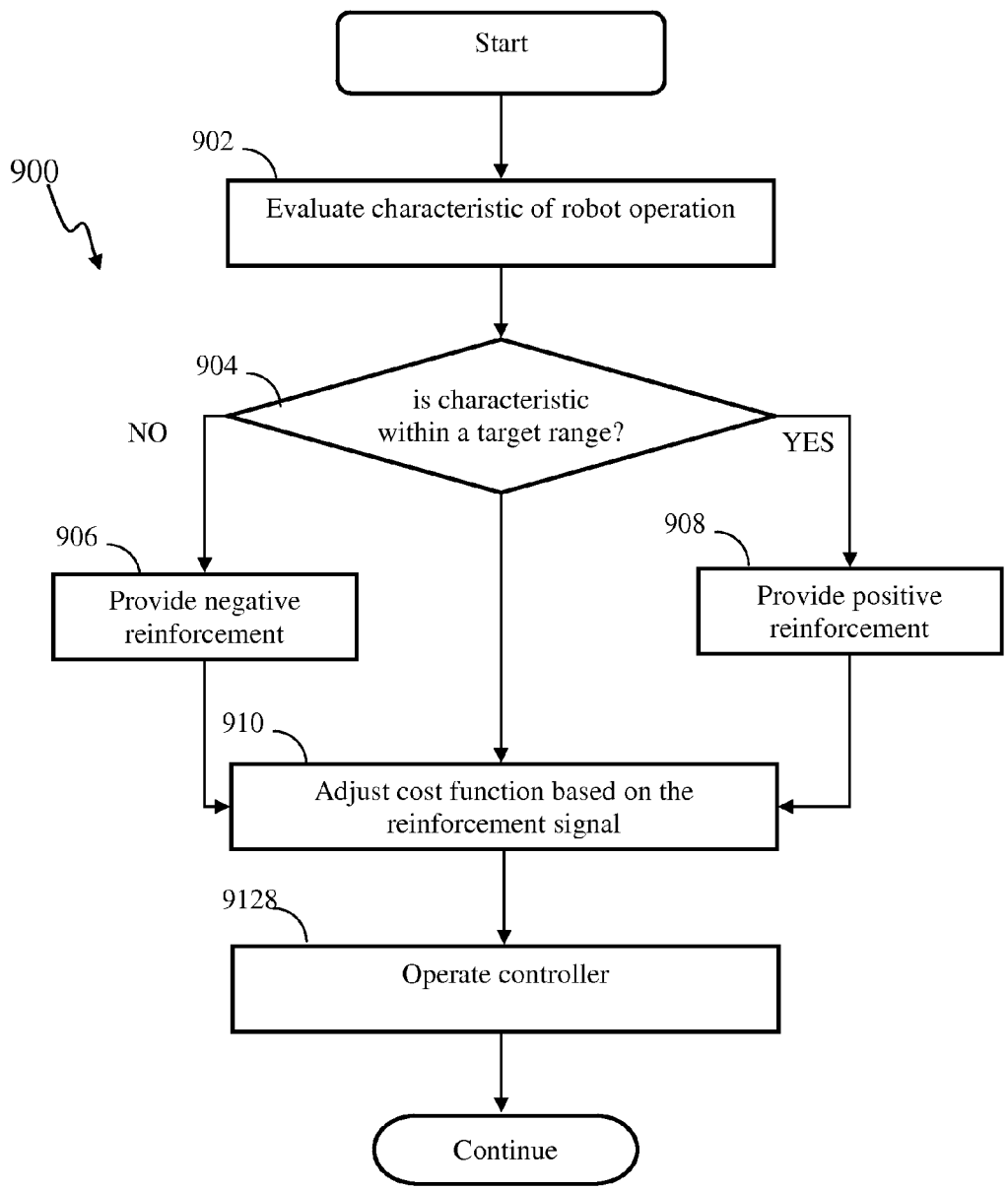
FIG. 9 is a logical flow diagram illustrating training of a robotic apparatus, in accordance with one or more implementations.

FIGS. 8-9 illustrate methods for training of robotic devices, in accordance with one or more implementations. The operations of methods 800, 900 presented below are intended to be illustrative. In some implementations, methods 800, 900 may be accomplished with one or more additional operations not described, and/or without one or more of the operations discussed. The order in which the operations of methods 800 are illustrated in FIGS. 8-9 and described below is not intended to be limiting.

Implementations of methods of FIGS. 8-9 may be realized in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 800-900 in response to instructions stored electronically on an electronic storage medium. The one or more processing devices may include one or more devices configured through hardware, firmware, and/or software to be specifically designed for execution of one or more of the operations of methods 800-900.

Referring now to FIG. 8 one exemplary implementation of the reinforcement learning method of the disclosure for use with, for example, the robotic system 100 of FIG. 1 is described in detail.

At operation 802 of method 800 a determination may be made by the controller of the robotic system (e.g., controller 102 of system 100 in FIG. 1) as to whether reinforcement input is received. The reinforcement may positive or negative reinforcement, configured based on an evaluation of robotic system performance. In one or more implementations, the evaluation may be based on a squared jerk cost function methodology described above, configured to enable the robotic apparatus to move like an animal.

Responsive to the reinforcement signal being detected, the method may proceed to operation 804 where immediate cost may be adjusted in accordance with the reinforcement signal. In one or more implementations, the adjustment may comprise positive and/or negative components illustrated and described with respect to FIGS. 3A-4, above.

At operation 806, the cost function F(q,t) may be configured in accordance with the adjusted instantaneous cost $C_i(q, t)$. In one or more implementations, the cost function may be configured in accordance with Eqn. 12 described above.

At operation 808, a controller may be configured. In one or more implementations, the controller may be configured in accordance with the updated cost function (e.g., Eqn. 12) and implements a control policy, which may comprise certain characteristics, such as minimizing energy use.

The control policy and/or the controller may be determined using any of reinforcement learning (RL), cost optimization, dynamic programming, and/or other stochastic and/or deterministic optimization algorithms. By way of illustration, the RL algorithm may comprise a modified version of the path integral policy iteration algorithm with a cost function being constructed in part based on clicker training and in part based accordingly to requirements for the control policy (e.g., minimizing energy, minimizing jerk along trajectories, make the movement more animal/human-like).

The updated cost function may modify the controller. The controller is an instantiation of the control policy, or the controller implement and applies the control policy, which is a more abstract concept. The control policy is a function which associates a motor output to states. It may be constructed by applying the controller to every state.

At operation 810, the controller may be operated in accordance with the updated controller structure of step 808.

FIG. 9 illustrates an exemplary method of training a robotic device to move in a manner that is similar to movements of animal using reinforcement learning methodology of the disclosure.

At operation 902 of method 900, an evaluation of robotic system performance may be made. In one or more implementations, the evaluation may be based on a squared jerk cost function methodology described above, configured to enable the robotic apparatus to move like an animal.

At operation 904, a determination may be made by the teacher as to whether operation of the robotic device is within target range. In some implementations, the determination may be based on whether the magnitude squared of the jerk is below maximum jerk level.

The overall cost function may comprise a portion due to teacher intervention (e.g., clicker), and a portion configured based on a control policy. In some implementations where a control policy outcome may be quantifiable (e.g., minimum energy, and/or minimum jerk) the control policy cost portion may be computed automatically without teacher intervention. In realizations wherein the control outcome may not be readily quantifiable (e.g., movement like a cat/human) clicker reinforcement may provide an online training method in order to achieve target behavior.

The robotic device may learn sport moves (e.g., karate kicks) and/or dancing moves (e.g., ballet Arabesque). The teacher may grade the robot according to how close it performs to the target trajectory (e.g., karate, ballet).

Responsive to the characteristic being outside the target range, the method 900 may proceed to step 906 where a negative reinforcement may be provided to the robot. The target range may be configured in accordance with the task, the target control policy and configuration of a particular robot (e.g., arm length and number of joints) and may comprise a range for evaluation, which may be similar and/or as precise or imprecise as when interacting and teaching tasks to children and/or animals. In one or more implementations, the negative reinforcement may comprise hard and/or soft indication. In some implementations, the reinforcement signal may be provided using a clicker (e.g., 610 of FIG. 6) configured to deliver different degrees of negative indication (e.g., "bad", "very bad"), as described in detail with respect to FIG. 6 above.

Responsive to the characteristic being within the target range, the method 900 may proceed to step 909 where a positive reinforcement may be provided to the robot. In one or more implementations, the positive reinforcement may comprise hard and/or soft indication. In some implementations, the reinforcement signal may be provided using a clicker (e.g., 610 of FIG. 6) configured to deliver different degrees of reinforcement indication (e.g., "excellent", "good", "very good"), as described in detail with respect to FIG. 6 above.

At operation 910, the cost function $F(q,t)$ and/or the controller may be configured in accordance with the adjusted instantaneous cost $C_i(q,t)$. In one or more implementations, the cost function may be configured in accordance with Eqn. 12 described above At operation 912, the controller may be operated in accordance with the updated controller structure of step 910.

Various exemplary spiking network apparatus comprising one or more of the methods set forth herein (e.g., using the reinforcement learning mechanisms explained above) are now described with respect to FIGS. 10-11C.

Figure 10:
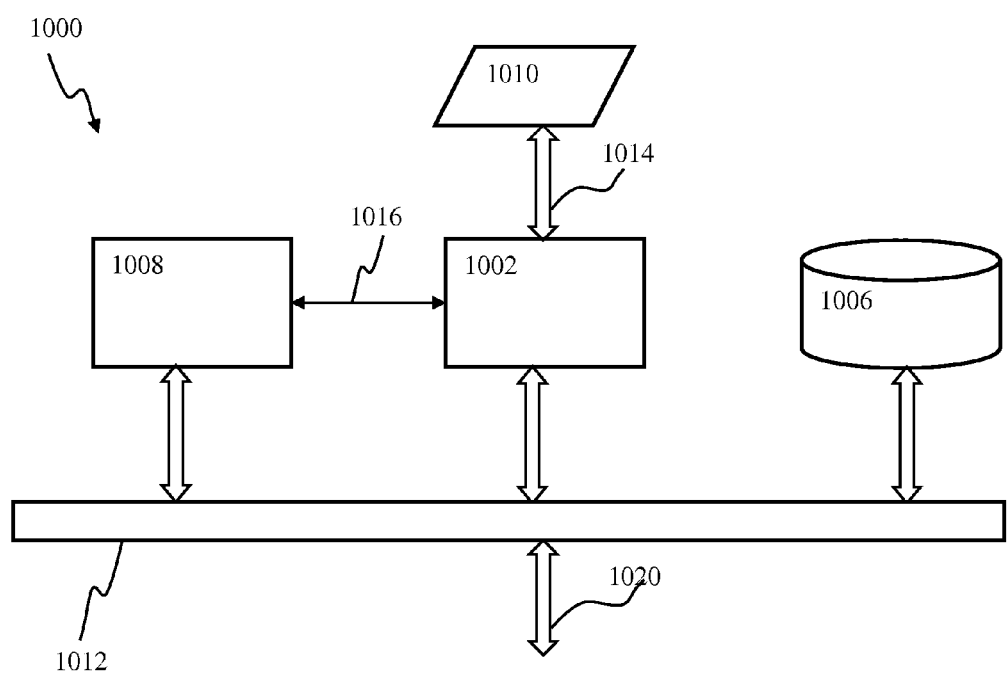
FIG. 10 is a block diagram illustrating computerized system useful for efficient connection plasticity update mechanism in a spiking network, in accordance with one or more implementations.

One particular implementation of the computerized neuromorphic processing system, for operating a computerized spiking network (and implementing the cost function determination methodology described supra), is illustrated in FIG. 10. The computerized system 1000 of FIG. 10 may comprise an input interface 1010, such as for example an image sensor, a computerized spiking retina, an audio array, a touch-sensitive input device, and/or other input interface. The input interface 1010 may be coupled to the processing block (e.g., a single or multi-processor block) via the input communication interface 1014. The system 1000 may comprise a random access memory (RAM) 1008, configured to store neuronal states and learning parameters (e.g., of Eqn. 1), and to facilitate learning.

In some implementations, the memory 1008 may be coupled to the processor 1002 via a direct connection (memory bus) 1016. The memory 1008 may also be coupled to the processor 1002 via a high-speed processor bus 1012.

The system 1000 may comprise a nonvolatile storage device 1006. The nonvolatile storage device 1006 may comprise, inter alia, computer readable instructions configured to implement various aspects of spiking neuronal network operation. The various aspects of spiking neuronal network operation may include one or more of sensory input encoding, connection plasticity, operation model of neurons, and/or other aspects of spiking neuronal network operation. In one or more implementations, the nonvolatile storage 1006 may be used to store state information of the neurons and connections when, for example, saving/loading network state snapshot, or implementing context switching. In some implementations, the context switching may comprise, for example, saving current network configuration for later use, and/or loading of a previously stored network configuration. In one or more implementations, the network configuration may comprise, inter alia, connection weights and update rules, neuronal states and learning rules, and/or other data.

In some implementations, the computerized apparatus 1000 may be coupled to one or more external processing/storage/input devices via an I/O interface 1020, such as a computer I/O bus (PCI-E), wired (e.g., Ethernet) or wireless (e.g., Wi-Fi) network connection.

In some implementations, the input/output interface may comprise a speech input (e.g., a microphone) and a speech recognition module configured to receive and recognize user commands.

It will be appreciated by those skilled in the arts that various processing devices may be used with computerized system 1000, including but not limited to, a single core/multicore CPU, DSP, FPGA, GPU, ASIC, combinations thereof, and/or other processors. Various user input/output interfaces may be similarly applicable to implementations of the invention including, for example, an LCD/LED monitor, touch-screen input and display device, speech input device, stylus, light pen, trackball, and/or other user I/O interfaces Referring now to FIG. 11A, some implementations of neuromorphic computerized system configured to implement cost function determination using reinforcement learning. The neuromorphic processing system 1130 of FIG. 11A may comprise a plurality of processing blocks (micro-blocks) 1140 where individual micro cores may comprise a computing logic core 1132 and a memory block 1134. The logic core 1132 may be configured to implement various aspects of neuronal node operation, such as the node model, and synaptic update and/or other tasks relevant to network operation. The memory block may be configured to store, inter alia, neuronal state variables and connection parameters (e.g., weights, delays, I/O mapping, and/or other connection parameters) of connections 1138.

Figure 11A:
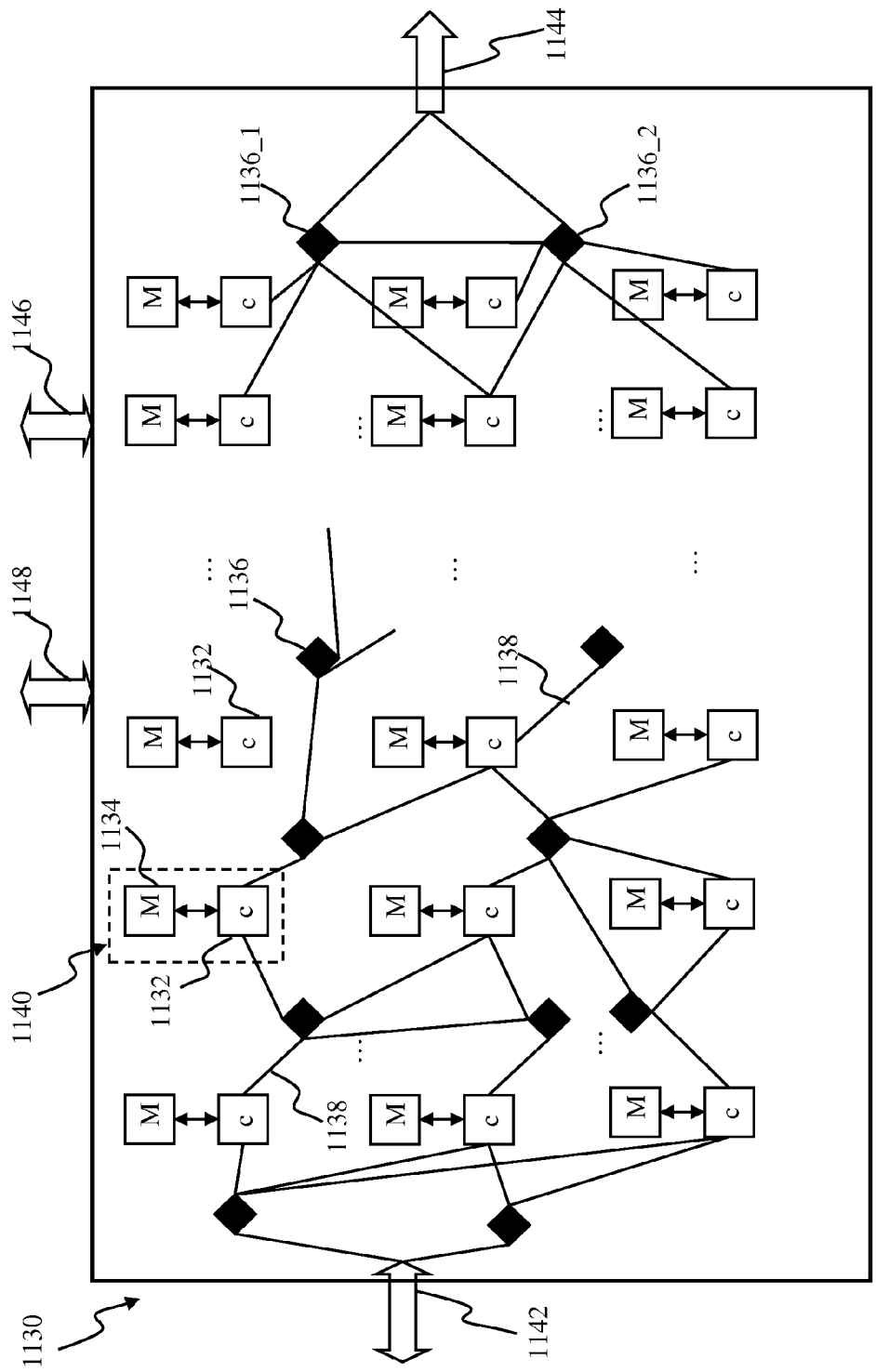
FIG. 11A is a block diagram illustrating a neuromorphic computerized system useful with efficient connection plasticity update mechanism in a spiking network, in accordance with one or more implementations.

The micro-blocks 1140 may be interconnected with one another using connections 1138 and routers 1136. As it is appreciated by those skilled in the arts, the connection layout in FIG. 11A is exemplary, and many other connection implementations (e.g., one to all, all-to-all, and/or other mapping) are compatible with the disclosure.

The neuromorphic apparatus 1130 may be configured to receive input (e.g., sensory input) via the interface 1142. In one or more implementations, applicable for example to interfacing with computerized spiking retina, or image array, the apparatus 1130 may provide feedback information via the interface 1142 to facilitate encoding of the input signal. In some implementations, the interface 1142 may be utilized to receive reinforcement signal (e.g., 210 in FIG. 1).

The neuromorphic apparatus 1130 may be configured to provide output via the interface 1144. In some implementations, the output may comprise one or more control commands.

The apparatus 1130, in one or more implementations, may interface to external fast response memory (e.g., RAM) via high bandwidth memory interface 1148, thereby enabling storage of intermediate network operational parameters (e.g., spike timing, and/or other parameters.). The apparatus 1130 may interface to external slower memory (e.g., Flash, or magnetic (hard drive)) via lower bandwidth memory interface 1146, in order to facilitate program loading, operational mode changes, and retargeting, where network node and connection information for a current task is saved for future use and flushed, and previously stored network configuration is loaded in its place.

Figure 11B:
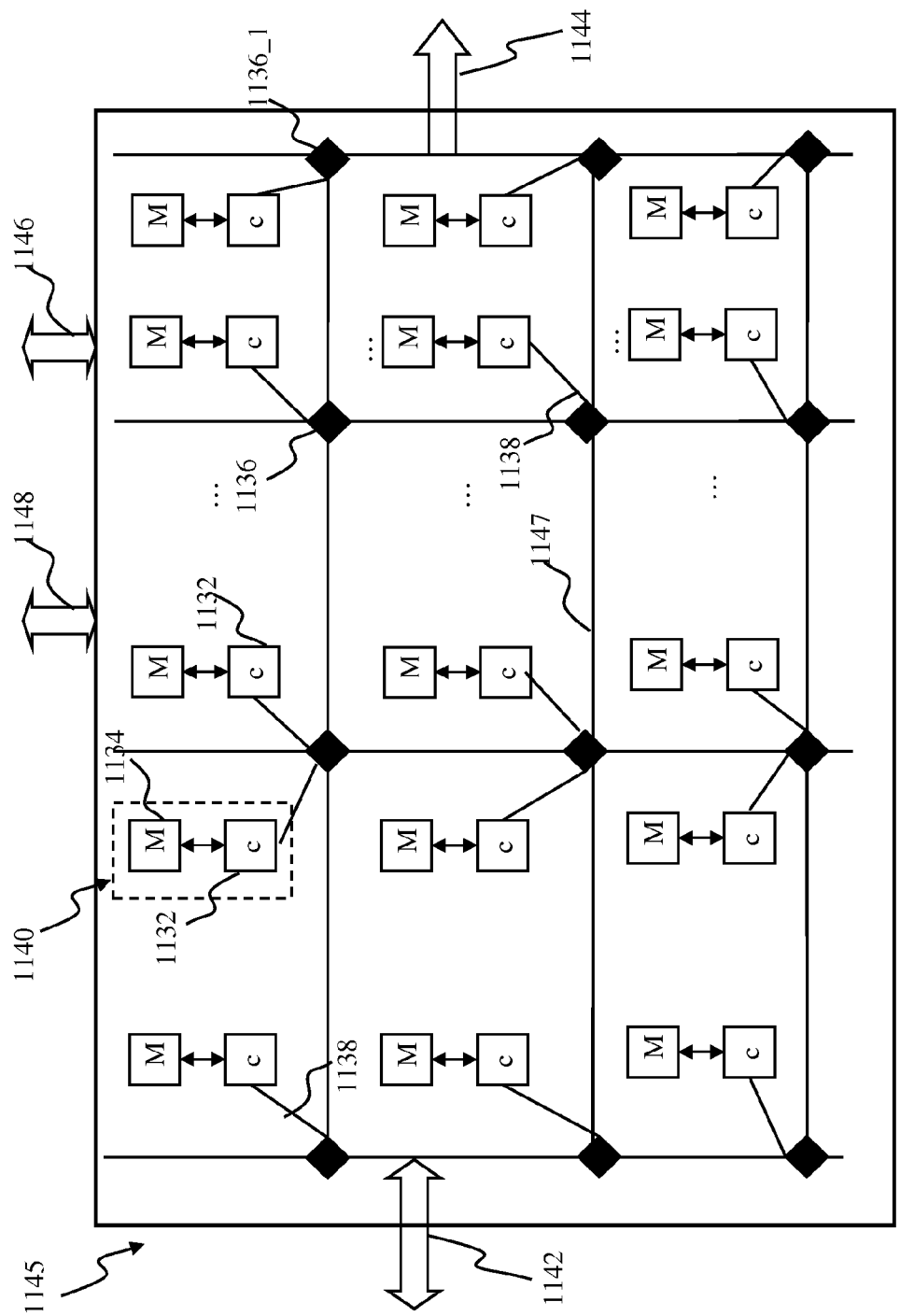
FIG. 11B is a block diagram illustrating a hierarchical neuromorphic computerized system architecture useful with efficient connection plasticity update mechanism in a spiking network, in accordance with one or more implementations.

FIG. 11B, illustrates one or more implementations of shared bus neuromorphic computerized system comprising micro-blocks, described with respect to FIG. 11B, supra, architecture coupled to a shared 1140. The apparatus 1145 of FIG. 11B may utilize one or more shared buses 1147 in order to interconnect micro-blocks 1140 with one another.

Figure 11C:
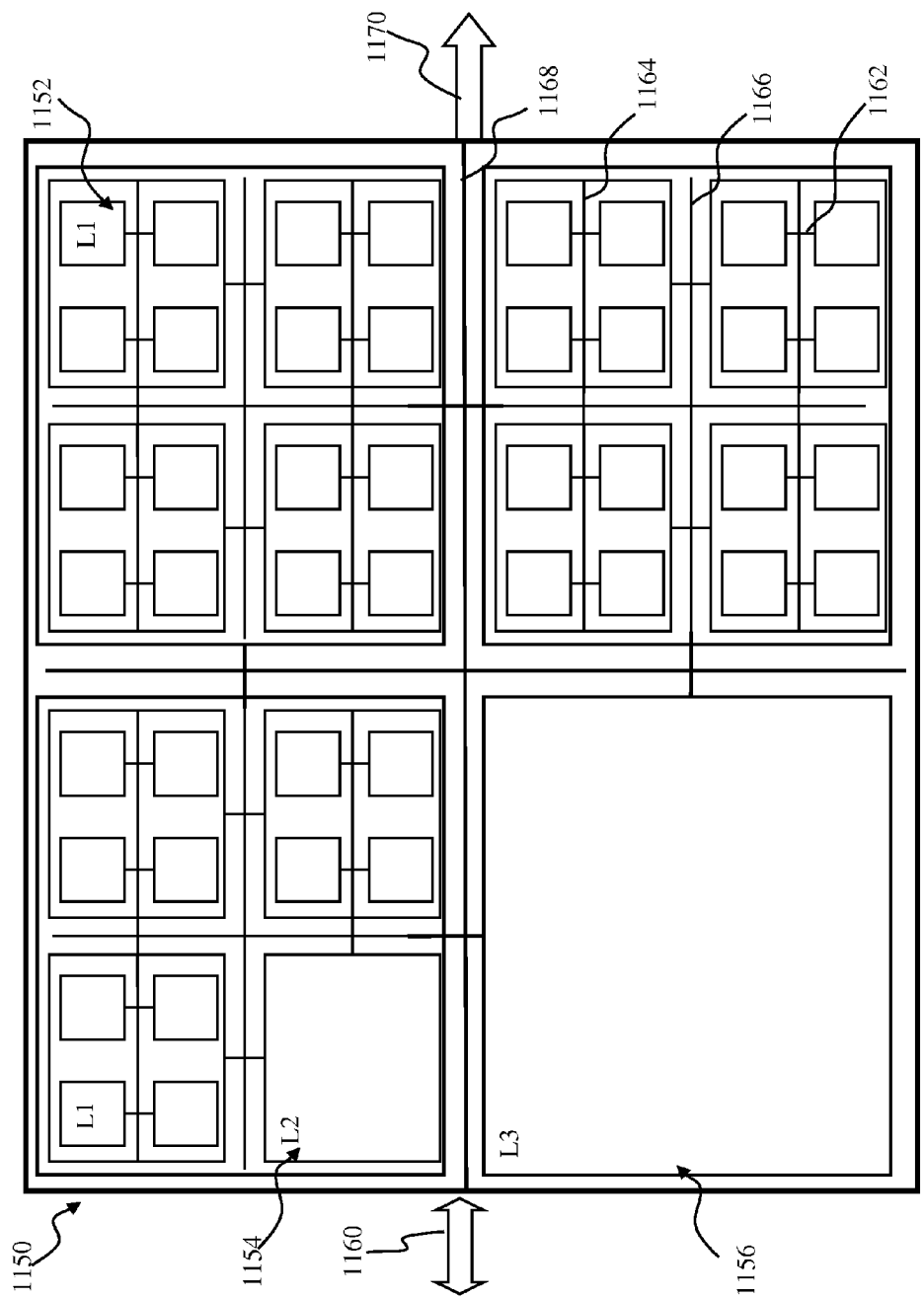
FIG. 11C is a block diagram illustrating cell-type neuromorphic computerized system architecture useful with efficient connection plasticity update mechanism in a spiking network, in accordance with one or more implementations.

FIG. 11C illustrates some implementations of cell-based neuromorphic computerized system architecture configured to implement efficient connection plasticity update mechanism in a spiking network is described in detail. The neuromorphic system 1150 of FIG. 11C may comprise a hierarchy of processing blocks (cells block). In some implementations, the lowest level L1 cell 1152 of the apparatus 1150 may comprise logic and memory and may be configured similar to the micro block 1140 of the apparatus shown in FIG. 11A. A number of cell blocks may be arranges in a cluster and communicate with one another a local interconnects 1162, 1164. Individual ones of such clusters may form higher level cell, e.g., cell L2, denoted as 1154 in FIG. 11d. Similarly several L2 clusters may communicate with one another via a second level interconnect 1166 and form a super-cluster L3, denoted as 1156 in FIG. 11D. The super-clusters 1154 may communicate via a third level interconnect 1168 and may form a next level cluster, and so on. It will be appreciated by those skilled in the arts that the hierarchical structure of the apparatus 1150, comprising four cells-per-level, is merely one exemplary implementation, and other implementations may comprise more or fewer cells per level, and/or fewer or more levels.

Different cell levels (e.g., L1, L2, L3) of the apparatus 1150 may be configured to perform functionality various levels of complexity. In some implementations, different L1 cells may process in parallel different portions of the visual input (e.g., encode different frame macro-blocks), with the L2, L3 cells performing progressively higher level functionality (e.g., edge detection, object detection). Different L2, L3, cells may also perform different aspects of operating, for example, a robot, with one or more L2/L3 cells processing visual data from a camera, and other L2/L3 cells operating motor control block for implementing lens motion what tracking an object or performing lens stabilization functions.

The neuromorphic apparatus 1150 may receive input (e.g., sensory input 228 of FIG. 2B) via the interface 1160. In one or more implementations, the interface 1160 may comprise a remote interface configured to receive reinforcement input (via e.g., a clicker 600 of FIG. 6 described above).

The neuromorphic apparatus 1150 may provide output via the interface 1170. In some implementations, the apparatus 1150 may perform all of the I/O functionality using single I/O block (not shown).

The apparatus 1150, in one or more implementations, may interface to external fast response memory (e.g., RAM) via high bandwidth memory interface (not shown), thereby enabling storage of intermediate network operational parameters (e.g., spike timing, number of spikes, and/or other parameters.). In one or more implementations, the apparatus 1150 may also interface to external slower memory (e.g., flash, or magnetic (hard drive)) via lower bandwidth memory interface (not shown), in order to facilitate program loading, operational mode changes, and retargeting, where network node and connection information for a current task may be saved for future use and flushed, and previously stored network configuration may be loaded in its place.

The systems 1150 may combine (e.g., encode) inputs of different origin, type, dynamic range, noise signature, and/or other characteristics. In one or more implementations, input encoding may utilize analog-to-spiking signal conversion using a kernel expansion technique described in detail in co-owned U.S. patent application Ser. No. 13/623,842, entitled "SPIKING NEURON NETWORK ADAPTIVE CONTROL APPARATUS AND METHODS", filed Sep. 20, 2012, incorporated herein by reference in its entirety. As used herein the terms "analog", and/or "continuous" are used to describe a non-spiking signal, such as a continuous (e.g., analog) and/or discrete (e.g., digital signal). In some implementations, the continuous input signal may include one or more of an analog signal, a polyadic signal with arity greater than 2, an n-bit long discrete signal with n-bits greater than 2, a real-valued signal, and/or other signals. The advantage of the input encoding method described in the above cited application is to combine the advantage of sensory and state encoding in high dimension by a multitude of linear and nonlinear kernel functions and operators with a reinforcement learning controller, which can efficiently learn to make use of all the distributed and parallel input signals to construct a controller realizing an optimization of a performance function.

In one or more implementations, the learning spiking network apparatus of the disclosure may be implemented as a software library configured to be executed by a computerized neural network apparatus (e.g., containing a digital processor). In some implementations, the learning apparatus may comprise a specialized hardware module (e.g., an embedded processor or controller). In some implementations, the spiking network apparatus may be implemented in a specialized or general purpose integrated circuit (e.g., ASIC, FPGA, PLD, and/or other integrated circuit). Myriad other implementations may exist that will be recognized by those of ordinary skill given the present disclosure.

Advantageously, the reinforcement learning procedures according to the present disclosure can be used to simplify and improve control tasks for a wide assortment of control applications including, without limitation, industrial control, adaptive signal processing, navigation, and autonomous robotics.

Autonomous robots may comprise robots that may perform tasks in unstructured environments without continuous human guidance. A high degree of robot autonomy may desirable in fields such as space exploration, cleaning floors, mowing lawns, and waste water treatment. Programming of autonomous robots may not be straightforward. Methodology described herein may be utilized in order to provide initial training of autonomous robots. In some implementations, the training may comprise an evaluation apparatus (e.g., a clicker).

The clicker-based training methodology may enable users with little technical knowledge about design of a particular robot to train it. In some applications, users having experience in training children and/or animals may employ similar approaches to training of robots utilizing clicker reinforcement learning process.

Clicker training may be employed with robots comprising a plurality of changeable parts (e.g., chassis, sensors, limbs) so that a modified robot (e.g., after a limb replacement) may be re-trained to account for changes in the robot plant dynamics after part replacement.

Clicker training may be employed without necessitating development of an accurate robot plant model while providing a mechanism for training through demonstration.

In some implementations, clicker training may be configured to generate a cost function that may enable robot movements to resemble human motion. Such outcomes may permits easier acceptance of robots in human society, permits easier acceptance of robots by animals, easier acceptance, integration and aesthetics of robots for the service industry, including waiter robots, home servicing, home helping, and/or other applications. In some applications (to for example entertainment), training described herein may enable robots to move with more aesthetics, grace, human-like manner, enabling robots to be utilized in performances, dances, and/or other entertainment purposes.

Exemplary implementations of the present disclosure may be useful in a variety of devices including without limitation prosthetic devices (such as artificial limbs), industrial control, autonomous and robotic apparatus, HVAC, and other electromechanical devices requiring accurate stabilization, set-point control, trajectory tracking functionality or other types of control. Examples of such robotic devices may include manufacturing robots (e.g., automotive), military devices, and medical devices (e.g., for surgical robots). Examples of autonomous navigation may include rovers (e.g., for extraterrestrial, underwater, hazardous exploration environment), unmanned air vehicles, underwater vehicles, smart appliances (e.g., ROOMBA®), and/or robotic toys. The present disclosure can advantageously be used in other applications of adaptive signal processing systems (comprising for example, artificial neural networks) including, for example, one or more or machine vision, pattern detection and pattern recognition, object classification, signal filtering, data segmentation, data compression, data mining, optimization and scheduling, complex mapping, and/or other adaptive signal processing systems.

It will be recognized that while certain aspects of the disclosure are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the invention. This description is in no way meant to be limiting, but rather should be taken as illustrative of the general principles of the invention. The scope of the disclosure should be determined with reference to the claims.

What is claimed is:

1. A method for training a physical robotic apparatus, the method being performed by a physical training apparatus configured to train the robotic apparatus, the training apparatus comprising one or more physical processors configured by computer readable instructions; the method comprising:

establishing, using one or more physical processors, a target trajectory for an operation of the robotic apparatus, the target trajectory being characterized by a performance parameter configured based on a cost function;

effectuating, using one or more physical processors, operation of the robotic apparatus in accordance with the target trajectory;

adjusting, using one or more physical processors, an instantaneous cost value based on a training signal, the training signal being provided based on an evaluation of a measure between a current value of the performance parameter and a target value of the performance parameter, the robotic apparatus being configured to receive the training signal via a remote link; and determining, using one or more physical processors, an updated cost function based on the adjusted instantaneous cost value and the cost function, the updated cost function being configured to transition the performance parameter towards the target value;

wherein:

the robotic apparatus comprises at least one artificial limb;

the training apparatus comprises a remote evaluation apparatus configured to communicate with the robotic apparatus via one or more of radio waves, sound waves, infrared waves, or visible light waves;

the remote evaluation apparatus comprises a first button and a second button;

the first button is configured to facilitate communication of positive reinforcement to the robotic apparatus based on performance associated with the performance parameter being within a given range; and the second button is configured to facilitate communication of negative reinforcement to the robotic apparatus based on the performance being outside the given range.

2. The method of claim 1, wherein the robotic apparatus is configured to operate autonomously subsequent receipt of the training signal.

3. The method of claim 1, wherein the robotic apparatus is configured to receive the training signal via the remote link based on the evaluation being performed by a human operator.

4. The method of claim 3, wherein the evaluation is based on visual observation of operation of the robotic apparatus.

5. The method of claim 1, wherein:
the performance parameter is configured based on a function of acceleration of at least a portion of the limb; and
the evaluation is based on a comparison between (i) a first trajectory motion of the limb during performance of a first task by the robotic apparatus and (ii) a second trajectory motion of a limb of a human during performance of the first task by the human.

6. The method of claim 5, wherein the function of the acceleration comprises jerk, the jerk being determined based on a temporal derivative of the acceleration.

7. The method of claim 5, wherein the artificial limb comprises an artificial leg and the first task comprises a gating motion towards an object.

8. The method of claim 5, wherein the artificial limb comprises an artificial hand and the first task comprises grasping of an object by the artificial hand.

9. The method of claim 8, wherein the artificial limb further comprises an artificial arm, the artificial hand being disposed at a distal end of the artificial arm.

10. The method of claim 1, wherein:
the transition of the performance parameter towards the target value is based on a minimization of the cost function; and
the training signal is configured to increase the instantaneous cost value based on the current performance value being separated from the target performance value by a first margin.

11. The method of claim 10, wherein the training signal is further configured to decrease the instantaneous cost value based on the current performance value being within the target performance value by a second margin.

12. The method of claim 10, wherein:
the training signal comprises two or more levels, individual ones of the two or more levels configured based on a distance measure between the current performance and the target performance; and
the adjustment of the instantaneous cost value is configured based on a one of the two or more levels.

13. The method of claim 1, wherein:
the target trajectory is characterized by at least one state parameter;
the cost function is configured based on the state parameter; and
the instantaneous cost value is configured to adjust the cost function within a range of the state parameter values.

14. The method of claim 13, wherein adjusting the cost function comprises one or more of a concave, a convex, or a step function determined for the range of the state parameter values.

15. The method of claim 14, wherein the state parameter comprises one or both of a spatial coordinate or a motion characteristic associated with the robotic apparatus.

16. A non-transitory computer-readable storage medium having instructions embodied thereon, the instructions being executable by a processor to perform a method for training a physical robotic apparatus, the method being performable by a physical training apparatus configured to train the robotic apparatus, the training apparatus comprising one or more physical processors configured by computer readable instructions, the method comprising:
establishing, using one or more physical processors, a target trajectory for an operation of the robotic apparatus, the target trajectory being characterized by a performance parameter configured based on a cost function;
effectuating, using one or more physical processors, operation of the robotic apparatus in accordance with the target trajectory;
adjusting, using one or more physical processors, an instantaneous cost value based on a training signal, the training signal being provided based on an evaluation of a measure between a current value of the performance parameter and a target value of the performance parameter, the robotic apparatus being configured to receive the training signal via a remote link; and
determining, using one or more physical processors, an updated cost function based on the adjusted instantaneous cost value and the cost function, the updated cost function being configured to transition the performance parameter towards the target value;
wherein:
the robotic apparatus comprises at least one artificial limb;
the training apparatus comprises a remote evaluation apparatus configured to communicate with the robotic apparatus via one or more of radio waves, sound waves, infrared waves, or visible light waves;
the remote evaluation apparatus comprises a first button and a second button;
the first button is configured to facilitate communication of positive reinforcement to the robotic apparatus based on performance associated with the performance parameter being within a given range; and
the second button is configured to facilitate communication of negative reinforcement to the robotic apparatus based on the performance being outside the given range.

17. A computerized robotic system, the system comprising:
a training apparatus and a robotic apparatus, the training apparatus being configured to train the robotic apparatus, the robotic apparatus comprising one or more processors configured to execute computer program modules, the computer program modules comprising:
a first logic module configured to receive a training signal from the training apparatus, the training signal being provided based on an evaluation of a measure between a current value of a performance parameter and a target value of the performance parameter;
a second logic module configured to operate the robotic apparatus in accordance with a target trajectory characterized by the performance parameter; and
a third logic module configured to (1) adjust an instantaneous cost value and, (2) determine an updated cost function configured to transition the performance parameter towards the target value, the updated cost function being based on an initial cost function associated with the performance parameter and the adjusted instantaneous cost value;
wherein:
the training apparatus comprises a remote evaluation apparatus configured to communicate with the robotic apparatus via one or more of radio waves, sound waves, infrared waves, or visible light waves;

the remote evaluation apparatus comprises a first button and a second button;

the first button is configured to facilitate communication of positive reinforcement to the robotic apparatus based on performance associated with the performance parameter being within a given range; and the second button is configured to facilitate communication of negative reinforcement to the robotic apparatus based on the performance being outside the given range.

18. A computerized robotic system, the system comprising:

a training apparatus and a robotic apparatus, the training apparatus being configured to train the robotic apparatus, the robotic apparatus comprising one or more processors configured to execute computer program modules, the computer program modules comprising:

a first logic module configured to receive a training signal from the training apparatus, the training signal being provided based on an evaluation of a measure between a current value of a performance parameter and a target value of the performance parameter;

a second logic module configured to operate the robotic apparatus in accordance with a target trajectory characterized by the performance parameter; and a third logic module configured to (1) adjust an instantaneous cost value and, (2) determine an updated cost function configured to transition the performance parameter towards the target value, the updated cost function being based on an initial cost function associated with the performance parameter and the adjusted instantaneous cost value; and a user interface apparatus configured to present information associated with a training history, the training history comprises information associated with (1) timing of one or more events associated with receipt of one or more training signals and (2) magnitude of adjustment of the instantaneous cost associated with individual ones of the one or more events wherein:

the training apparatus comprises a remote evaluation apparatus configured to communicate with the robotic apparatus via one or more of radio waves, sound waves, infrared waves, or visible light waves;

the target trajectory is characterized by at least one state parameter; and the user interface apparatus is configured to enable modification of the training history, the modification comprising one or more of (1) addition of another event associated with another training signal, (2) removal of at least one existing event, or (3) adjustment of a value of the state parameter associated with the event.

19. A computerized robotic system, the system comprising:

a training apparatus and a robotic apparatus, the training apparatus being configured to train the robotic apparatus, the robotic apparatus comprising one or more processors configured to execute computer program modules, the computer program modules comprising:

a first logic module configured to receive a training signal from the training apparatus, the training signal being provided based on an evaluation of a measure between a current value of a performance parameter and a target value of the performance parameter;

a second logic module configured to operate the robotic apparatus in accordance with a target trajectory characterized by the performance parameter; and a third logic module configured to (1) adjust an instantaneous cost value and, (2) determine an updated cost function configured to transition the performance parameter towards the target value, the updated cost function being based on an initial cost function associated with the performance parameter and the adjusted instantaneous cost value; and a user interface apparatus configured to present information associated with a training history, the training history comprises information associated with (1) timing of one or more events associated with receipt of one or more training signals and (2) magnitude of adjustment of the instantaneous cost associated with individual ones of the one or more events wherein:

the training apparatus comprises a remote evaluation apparatus configured to communicate with the robotic apparatus via one or more of radio waves, sound waves, infrared waves, or visible light waves;

the state parameter comprises a motion characteristic of the robotic apparatus; and the history modification further comprises a transformation of the instantaneous cost associated with a given event into the motion characteristic.

\* \* \* \* \*